(12) United States Patent
Yoshida et al.

(10) Patent No.: US 10,483,515 B2
(45) Date of Patent: Nov. 19, 2019

(54) POWER STORAGE DEVICE, POWER STORAGE SYSTEM, ELECTRONIC DEVICE, ELECTRIC VEHICLE, AND POWER SYSTEM

(71) Applicant: SONY CORPORATION, Tokyo (JP)

(72) Inventors: Naotake Yoshida, Fukushima (JP); Hiroaki Ono, Miyagi (JP); Tsutomu Aoyama, Fukushima (JP); Tatsuya Adachi, Fukushima (JP); Naoyuki Sugeno, Fukushima (JP); Munenori Inden, Fukushima (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/111,215

(22) PCT Filed: Jan. 22, 2015

(86) PCT No.: PCT/JP2015/052416
§ 371 (c)(1),
(2) Date: Jul. 13, 2016

(87) PCT Pub. No.: WO2015/111758
PCT Pub. Date: Jul. 30, 2015

(65) Prior Publication Data
US 2016/0336572 A1    Nov. 17, 2016

(30) Foreign Application Priority Data

Jan. 23, 2014 (JP) ................................ 2014-010051
Jan. 7, 2015 (JP) ................................ 2015-001776

(51) Int. Cl.
*H01M 2/20* (2006.01)
*B60L 50/64* (2019.01)
(Continued)

(52) U.S. Cl.
CPC ........... *H01M 2/206* (2013.01); *B60L 3/0046* (2013.01); *B60L 50/64* (2019.02); *B60L 50/66* (2019.02);
(Continued)

(58) Field of Classification Search
CPC ........ H01M 2/206; H01M 2/266; H01M 2/34; H01M 2/348; H01M 2200/20;
(Continued)

(56) References Cited

U.S. PATENT DOCUMENTS 3,413,586 A * 11/1968 Salzer .................... H01H 85/10
                                                337/158
6,692,864 B1 * 2/2004 Dansui ................ H01M 2/1055
                                                429/100
(Continued)

FOREIGN PATENT DOCUMENTS

CN    102057519 A    5/2011
CN    102812578 A    12/2012
(Continued)

OTHER PUBLICATIONS

Office Action for CN Patent Application No. 201580004589.5, dated Jun. 29, 2018, 1 page.
(Continued)

*Primary Examiner* — Behrang Badii
*Assistant Examiner* — David A Testardi
(74) *Attorney, Agent, or Firm* — Chip Law Group

(57) ABSTRACT

There is provided a power storage system comprising a plurality of battery lines and a connection terminal unit. Each battery line comprises a plurality of battery cells arranged in a first direction. The connection terminal unit is electrically connected to terminal faces of each battery cell of a group of the battery cells, and the group of the battery cells is disposed in a second direction. At least one cut out
(Continued)

is formed in the connection terminal unit. There are also provided a power storage system for a house, a power storage system for a vehicle, an electronic device and an electric vehicle including the power storage device. There is also provided a connection terminal unit for electrically connecting a plurality of battery cells, in which at least one cut out is formed in the connection terminal unit.

16 Claims, 21 Drawing Sheets

(51) Int. Cl.

| | |
|---|---|
| H01M 2/10 | (2006.01) |
| H01M 10/0525 | (2010.01) |
| H01M 10/42 | (2006.01) |
| H01M 10/48 | (2006.01) |
| H01M 10/6553 | (2014.01) |
| H02J 7/04 | (2006.01) |
| H01M 2/34 | (2006.01) |
| H01M 10/46 | (2006.01) |
| H02J 7/00 | (2006.01) |
| B60L 3/00 | (2019.01) |
| B60L 53/00 | (2019.01) |
| B60L 58/26 | (2019.01) |
| B60L 50/60 | (2019.01) |
| H01M 10/04 | (2006.01) |
| H01R 11/28 | (2006.01) |
| H01M 10/625 | (2014.01) |

(52) U.S. Cl.
CPC ............ *B60L 53/00* (2019.02); *B60L 58/26* (2019.02); *H01M 2/1077* (2013.01); *H01M 2/348* (2013.01); *H01M 10/0525* (2013.01); *H01M 10/4257* (2013.01); *H01M 10/46* (2013.01); *H01M 10/482* (2013.01); *H01M 10/486* (2013.01); *H01M 10/6553* (2015.04); *H02J 7/0024* (2013.01); *H02J 7/047* (2013.01); *B60L 2240/545* (2013.01); *H01M 10/0422* (2013.01); *H01M 10/625* (2015.04); *H01M 2010/4271* (2013.01); *H01M 2200/103* (2013.01); *H01M 2220/20* (2013.01); *H01M 2220/30* (2013.01); *H01R 11/288* (2013.01); *Y02E 60/122* (2013.01); *Y02T 10/705* (2013.01); *Y02T 10/7011* (2013.01); *Y02T 10/7072* (2013.01); *Y02T 90/14* (2013.01)

(58) Field of Classification Search
CPC .......... H01M 2200/103; H01M 10/625; B60R 16/033; B60L 11/1877; B60L 11/1879; B60L 3/0046; B60L 50/64; H01R 11/288
See application file for complete search history.

(56) References Cited

U.S. PATENT DOCUMENTS

| | | | | |
|---|---|---|---|---|
| 7,479,346 | B1* | 1/2009 | Chow | H01M 2/1083 320/112 |
| 2002/0102457 | A1* | 8/2002 | Oogami | B60L 3/0046 429/159 |
| 2005/0031945 | A1* | 2/2005 | Morita | H01M 2/202 429/158 |
| 2006/0177734 | A1* | 8/2006 | Yao | H01M 2/202 429/160 |
| 2008/0254356 | A1* | 10/2008 | Liersch | H01M 2/105 429/160 |
| 2009/0297892 | A1* | 12/2009 | Ijaz | H01M 2/105 429/7 |
| 2011/0008655 | A1* | 1/2011 | White | H01M 2/1055 429/62 |
| 2011/0171505 | A1* | 7/2011 | Kishll | H01M 2/1016 429/82 |
| 2011/0223776 | A1* | 9/2011 | Ferber, Jr. | H05K 3/325 439/39 |
| 2011/0274963 | A1* | 11/2011 | Bae | B23K 11/0033 429/152 |
| 2011/0308856 | A1* | 12/2011 | Park | H01M 2/20 174/84 R |
| 2012/0100399 | A1 | 4/2012 | Adachi et al. | |
| 2012/0107651 | A1* | 5/2012 | Hotta | H01M 2/202 429/61 |
| 2012/0135296 | A1* | 5/2012 | Itoi | H01M 2/105 429/159 |
| 2012/0141852 | A1* | 6/2012 | Eberhard | H01M 2/1077 429/98 |
| 2012/0149258 | A1* | 6/2012 | Tartaglia | B23K 11/0033 439/890 |
| 2012/0150375 | A1* | 6/2012 | Adachi | H01M 2/34 701/22 |
| 2012/0189901 | A1* | 7/2012 | Chuang | H01M 2/02 429/158 |
| 2013/0011719 | A1 | 1/2013 | Yasui et al. | |
| 2013/0101892 | A1* | 4/2013 | Nickola | H01M 2/206 429/158 |
| 2013/0143101 | A1* | 6/2013 | Nakagawa | B60L 11/1877 429/157 |
| 2013/0202941 | A1* | 8/2013 | Ono | H01H 69/02 429/121 |
| 2013/0337291 | A1* | 12/2013 | Mayer | H01M 2/202 429/7 |
| 2014/0011073 | A1* | 1/2014 | Matthias | H01M 2/206 429/160 |
| 2014/0193674 | A1* | 7/2014 | Takasaki | H01M 2/1077 429/53 |
| 2014/0255750 | A1* | 9/2014 | Jan | H01M 2/206 429/120 |
| 2015/0180011 | A1* | 6/2015 | Hoshino | H01M 2/34 429/61 |
| 2015/0364744 | A1* | 12/2015 | Takano | H01M 2/34 429/61 |

FOREIGN PATENT DOCUMENTS

| | | | |
|---|---|---|---|
| DE | 102011115452 A1 | * | 4/2013 |
| EP | 1986252 A | | 10/2008 |
| EP | 1986252 A2 | | 10/2008 |
| EP | 2355205 A1 | * | 8/2011 |
| JP | 2006-185669 A | | 7/2006 |
| JP | 2008-541386 A | | 11/2008 |
| JP | 2009-123371 A | | 6/2009 |
| JP | 2011-521403 A | | 7/2011 |
| JP | 2011233319 A | * | 11/2011 |
| JP | 2012054121 A | * | 3/2012 |
| JP | 2012-124043 A | | 6/2012 |
| JP | 5030499 B2 | | 9/2012 |
| JP | 2015-011767 A | | 1/2015 |
| JP | 2015-011956 A | | 1/2015 |
| WO | WO-2012/164832 A1 | * | 12/2012 |
| WO | 2013/118738 A1 | | 8/2013 |
| WO | 2013/131588 A2 | | 9/2013 |
| WO | WO-2013/131588 A2 | * | 9/2013 |
| WO | 2013/131588 A2 | | 12/2013 |

OTHER PUBLICATIONS

Office Action for JP Patent Application No. 2015-001776, dated Oct. 2, 2018, 03 pages of Office Action and 03 pages of English Translation.

Office Action for CN Patent Application No. 201580004589.5, dated Dec. 5, 2018, 07 pages of Office Action.

Office Action for AU Patent Application No. 2015209980, dated Nov. 22, 2018, 3 pages.

(56) References Cited

OTHER PUBLICATIONS

Office Action for CN Patent Application No. 201580004589.5, dated Aug. 28, 2019, 07 pages of Office Action and 11 pages of English Translation.

\* cited by examiner

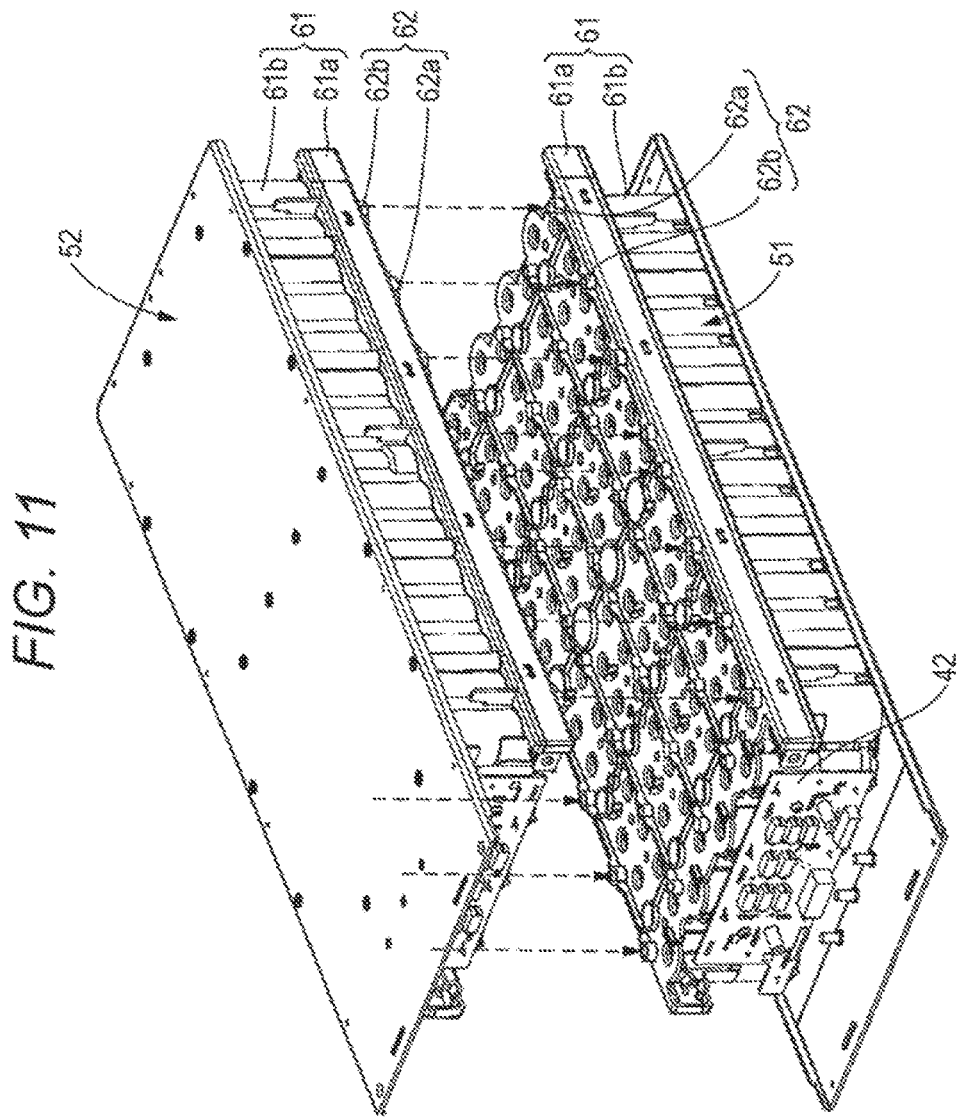

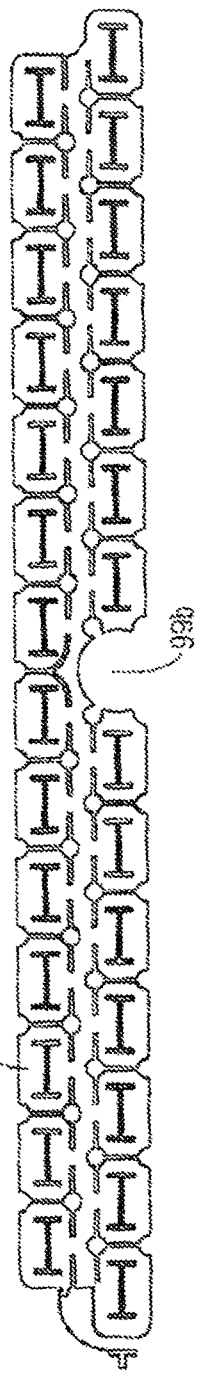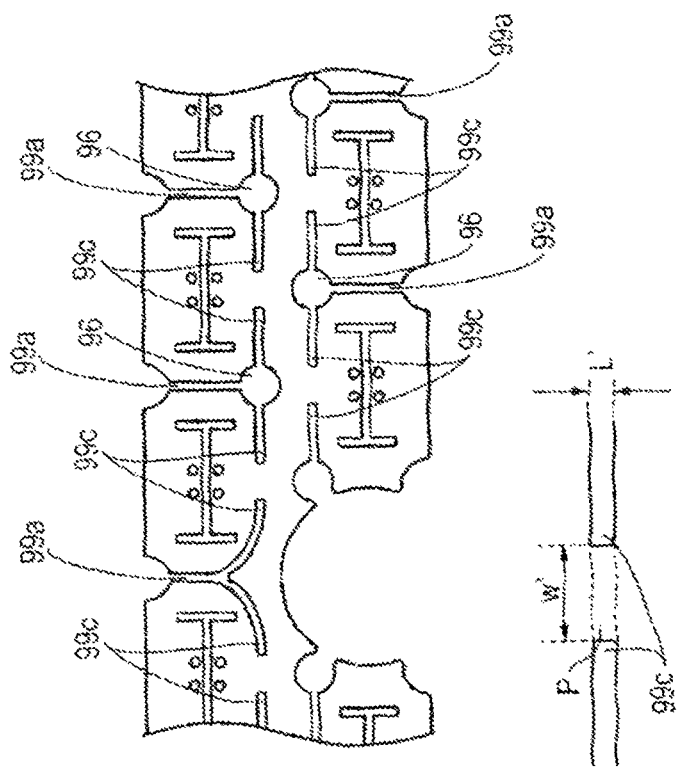
FIG. 17A
FIG. 17B
FIG. 17C

POWER STORAGE DEVICE, POWER STORAGE SYSTEM, ELECTRONIC DEVICE, ELECTRIC VEHICLE, AND POWER SYSTEM

CROSS REFERENCE TO RELATED APPLICATIONS

This application is a U.S. National Phase of International Patent Application No. PCT/JP2015/052416 filed on Jan. 22, 2015, which claims priority benefit of Japanese Patent Application No. 2014-010051 filed in the Japan Patent Office on Jan. 23, 2014 and Japanese Patent Application No 2015-001776 filed in the Japan Patent Office on Jan. 7, 2015. Each of the above-referenced applications is hereby incorporated herein by reference in its entirety.

TECHNICAL FIELD

The present technology relates to a power storage device, a power storage system, an electronic device, an electric vehicle, and a power system.

BACKGROUND ART

In recent years, use of secondary batteries such as lithium ion batteries has rapidly expanded to power storage devices, automobile batteries and the like combined with new energy systems such as solar batteries and wind power generation. A battery system with one or a plurality of power storage devices connected is used. The power storage device is formed by putting one or a plurality of battery blocks into an armoring case. The battery block is formed by connecting a plurality of unit batteries (referred to as single battery or cell as well. In the ensuing description, the unit battery is referred to simply as battery cell as the occasion may demand), which are an example of power storage elements.

In Patent Literature 1 to Patent Literature 5 stated below, technologies relating to power storage devices are disclosed.

CITATION LIST

Patent Literature

[PTL 1] JP 2006-185669 A
[PTL 2] JP 2011-521403 W
[PTL 3] JP 2008-541386 W
[PTL 4] JP 2009-123371 A
[PTL 5] JP 5030499 B1

SUMMARY

According to an embodiment, the present disclosure provides a power storage system comprising: a plurality of battery lines, each battery line comprising a plurality of battery cells arranged in a first direction; and a connection terminal unit electrically connected to terminal faces of each battery cell of a group of the battery cells. The group of the battery cells is disposed in a second direction, and at least one cut out is formed in the connection terminal unit.

According to an embodiment, the present disclosure provides a power storage device comprising: a plurality of battery lines each including a plurality of battery cells arranged in a line form in a line direction, a battery block group obtained by arranging the plurality of battery lines in parallel in a direction substantially perpendicular to the line direction of the battery lines and a connection terminal unit joined to terminal faces of a plurality of battery cells included in at least one of the battery lines. The connection terminal unit is disposed to be parallel to the line direction of the battery lines, and the connection terminal unit includes a fusing unit to be fused to intercept a current. An electrical resistance $R_t$ of the fusing unit satisfies Mathematical Formula 2:

[Mathematical Formula 2]

$$\frac{T_1 - T_C}{R_\theta I_1^2 (1 - e^{-\frac{t_1}{CR_\theta}})} \leq R_t \leq \frac{\Delta T_0}{R_\theta I_0^2}, \quad (1)$$

wherein $T_1$ is a melting point in degrees Kelvin of the fusing unit, $T_C$ is a temperature in degrees Kelvin of an environment in which the power storage device is used, $I_1$ is a short-circuit current in Amperes flowing at a time of short-circuit, C is a thermal capacity in Joules per degree Kelvin of the fusing unit, $t_1$ is a fusing time in seconds of the fusing unit in case where the short-circuit current has flown, $t_1=1$ second, $R_\theta$ is a thermal resistance in degrees Kelvin per Watts of the fusing unit and $R_\theta=(1/\lambda) \times (L/S)$, $\lambda$ is a thermal conductivity in Watts per meters of a heat transfer unit in the connection terminal unit, L is a length in meters of the heat transfer unit, S is a cross-sectional area in square meters of the heat transfer unit, $R_t$ is an electrical resistance in Ohms of the fusing unit and $R_t=(1/\sigma) \times (L'/S')$, $\sigma$ is an electric conductivity [1/Ω·m] of the fusing unit, L' is a length in meters of the fusing unit, S' is a cross-sectional area in square meters of the fusing unit, $I_0$ is a maximum current in Amperes at a time of ordinary use, and $\Delta T_0$ is an upper limit of temperature rise in degrees Kelvin.

According to an embodiment, the present disclosure provides a power storage device comprising: an exterior battery case; a first battery unit including a first battery block group; and a second battery unit including a second battery block group. Each of the first battery block group and the second battery block group comprises a plurality of battery lines each including a plurality of battery cells arranged in a first direction. The plurality of battery lines is arranged in parallel in a second direction substantially perpendicular to the first direction. Each of the first battery unit and the second battery unit comprises a fitting unit projected from a top face unit of the battery unit. The fitting unit of the first battery unit is opposed to and in contact with the fitting unit of the second battery unit, and a gap is formed between the first battery unit and the second battery unit.

According to an embodiment, the present disclosure provides a connection terminal unit for electrically connecting a plurality of battery cells. At least one cut out is formed in the connection terminal unit.

Technical Problem

In power storage devices, it is demanded to enhance the safety. Therefore, it is desirable to provide a power storage device capable of enhancing the safety, and a power storage system, an electronic device, an electric vehicle, and a power system using the power storage device.

Solution to Problem

To solve the above problem, the present technology provides a power storage device including: a battery block group obtained by arranging a plurality of battery lines each including a plurality of battery cells arranged in a line form, in parallel in a direction substantially perpendicular to a direction of the line; and a connection terminal unit joined to terminal faces of a plurality of battery cells included in at least one of the battery lines and disposed to be parallel in longitudinal direction to the line direction of the battery lines, the connection terminal unit including cut outs formed in a direction substantially perpendicular to the longitudinal direction.

The present technology provides a power storage device including: a battery block group obtained by arranging a plurality of battery lines each including a plurality of battery cells arranged in a line form, in parallel in a direction substantially perpendicular to a direction of the line; and a connection terminal unit joined to terminal faces of a plurality of battery cells included in at least one of the battery lines and disposed to be parallel in longitudinal direction to the line direction of the battery lines, the connection terminal unit including a fusing unit to be fused to intercept a current, electrical resistance Rt of the fusing unit satisfying the following expression.

[Mathematical Formula 1]

$$\frac{T_1 - T_C}{R_\theta I_1^2 \left(1 - e^{-\frac{t_1}{C k_\theta}}\right)} \leq R_t \leq \frac{\Delta T_0}{R_\theta I_0^2} \quad (1)$$

$T_1$: Melting point [K] of the fusing unit
$T_C$: Temperature of environment [K] in which the power storage device is used
$I_1$: Short-circuit current [A]
C: Thermal capacity [J/K] of the fusing unit
$t_1$: Fusing time [sec] of the fusing unit in case where the short-circuit current has flown, $t_1 = 1$ [sec]
$R_\theta$: Thermal resistance [K/W] of the fusing unit found according to $R_\theta = (1/\lambda) \times (L/S)$ (λ: thermal conductivity of the heat transfer unit in the connection terminal unit [W/m], L: length of the heat transfer unit in the connection terminal unit [m], S: cross-sectional area of the heat transfer unit in the connection terminal unit [m²])
$R_r$: Electrical resistance [Ω] of the fusing unit found according to $R_r = (1/\sigma) \times (L'/S')$ (σ: electric conductivity [1/Ω·m] of the fusing unit, L': length [m] of the fusing unit, S': cross-sectional area [m²] of the fusing unit)
$I_0$ = Maximum current at time of ordinary use [A]
$\Delta T_0$ = Upper limit of temperature rise $\Delta T_0$ [K]

The present technology provides a power storage device including: an armoring case; and a battery unit accommodated in the armoring case and stacked in two or more stages, the battery unit including a battery block group obtained by arranging a plurality of battery lines each including a plurality of battery cells arranged in a line form, in parallel in a direction substantially perpendicular to a direction of the line, and a battery case accommodating the battery block group and including a fitting unit projected from a top face unit, the fitting unit of a first battery case and the fitting unit of a second battery case opposed to the first battery case being brought into contact and fitted, and a gap being formed between the first battery case and the second battery case.

A power storage system, an electronic device, an electric vehicle, and a power system according to an embodiment of the present technology include the above-described power storage device.

Advantageous Effects of Invention

According to an embodiment of the present technology, an effect that the safety can be enhanced is brought about.

BRIEF DESCRIPTION OF DRAWINGS

FIG. 11 is a perspective view illustrating a state before two battery units are combined.
FIG. 17A is a plane view illustrating a configuration example of the connection terminal unit.
FIG. 17B and FIG. 17C are enlarged plane views obtained by enlarging a portion of the connection terminal unit illustrated in FIG. 17A.

DESCRIPTION OF EMBODIMENTS

Hereafter, embodiments of the present technology will be described with reference to the drawings. Description follows a sequence described below. Throughout all diagrams of the embodiments, the same portions or corresponding portions are denoted by like characters.

1. First embodiment (one example of a power storage device)
2. Second embodiment (another example of a power storage device)
3. Other embodiment (modification example)
4. Application example Embodiments and the like described hereafter are preferred concrete example of the present technology, and contents of the present technology are not limited to these embodiments and the like. Furthermore, effects described in the present specification are strictly examples and not limited. Furthermore, it is not denied that effects different from exemplified effects exist.

1. First Embodiment

Configuration Example of Power Storage Device

Figure 1:
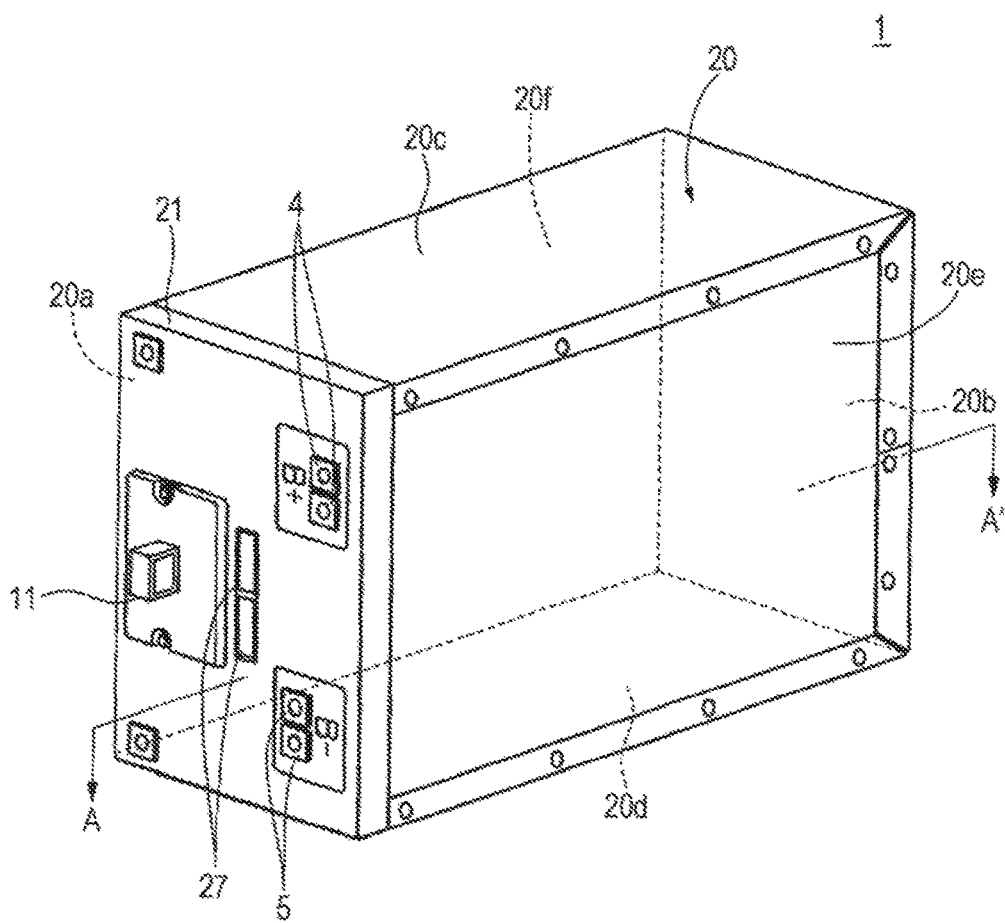
FIG. 1 is a perspective view illustrating an exterior view of a power storage device.
Figure 2:
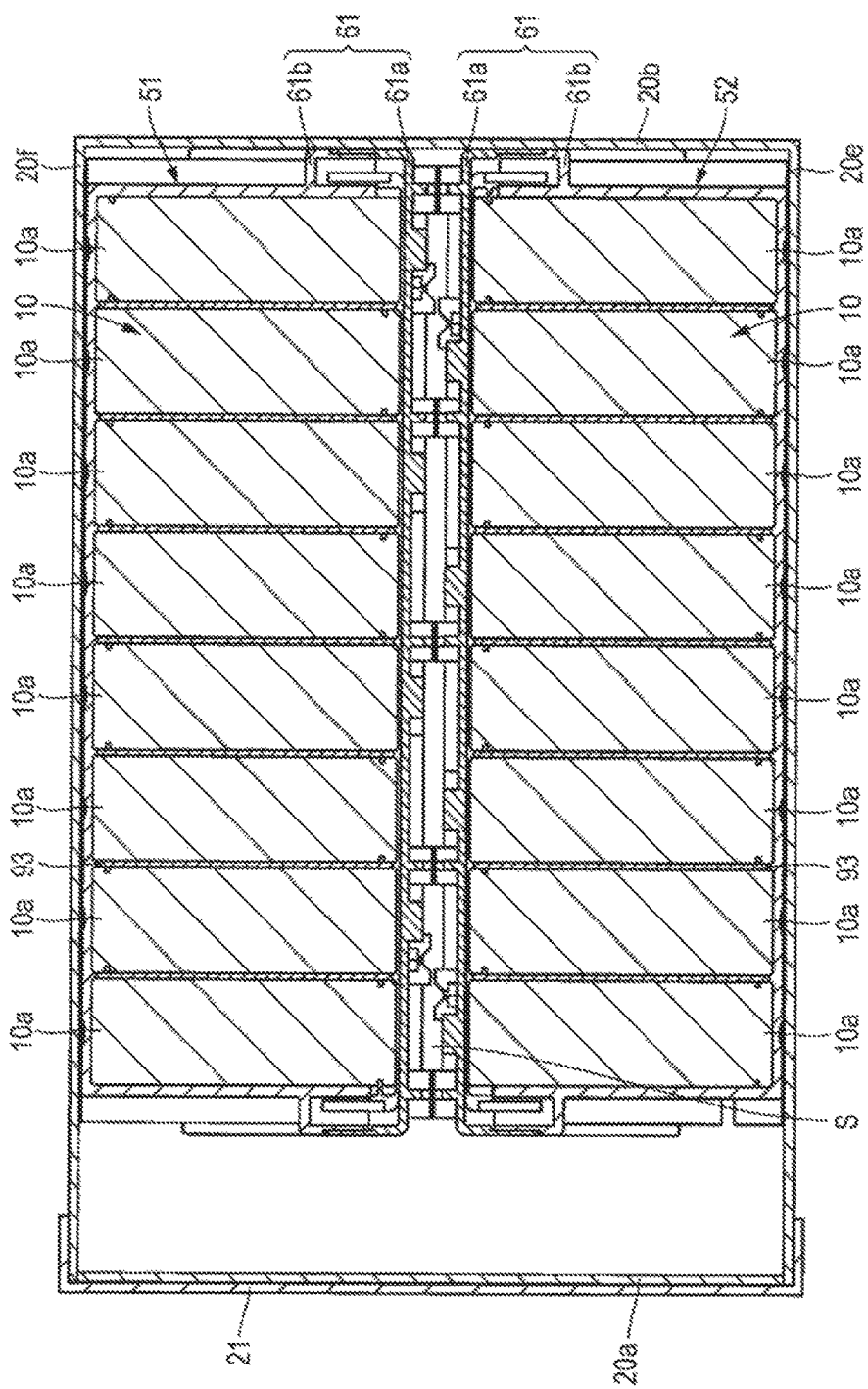
FIG. 2 is a schematic sectional view taken along a line A-A' in FIG. 1.
Figure 3:
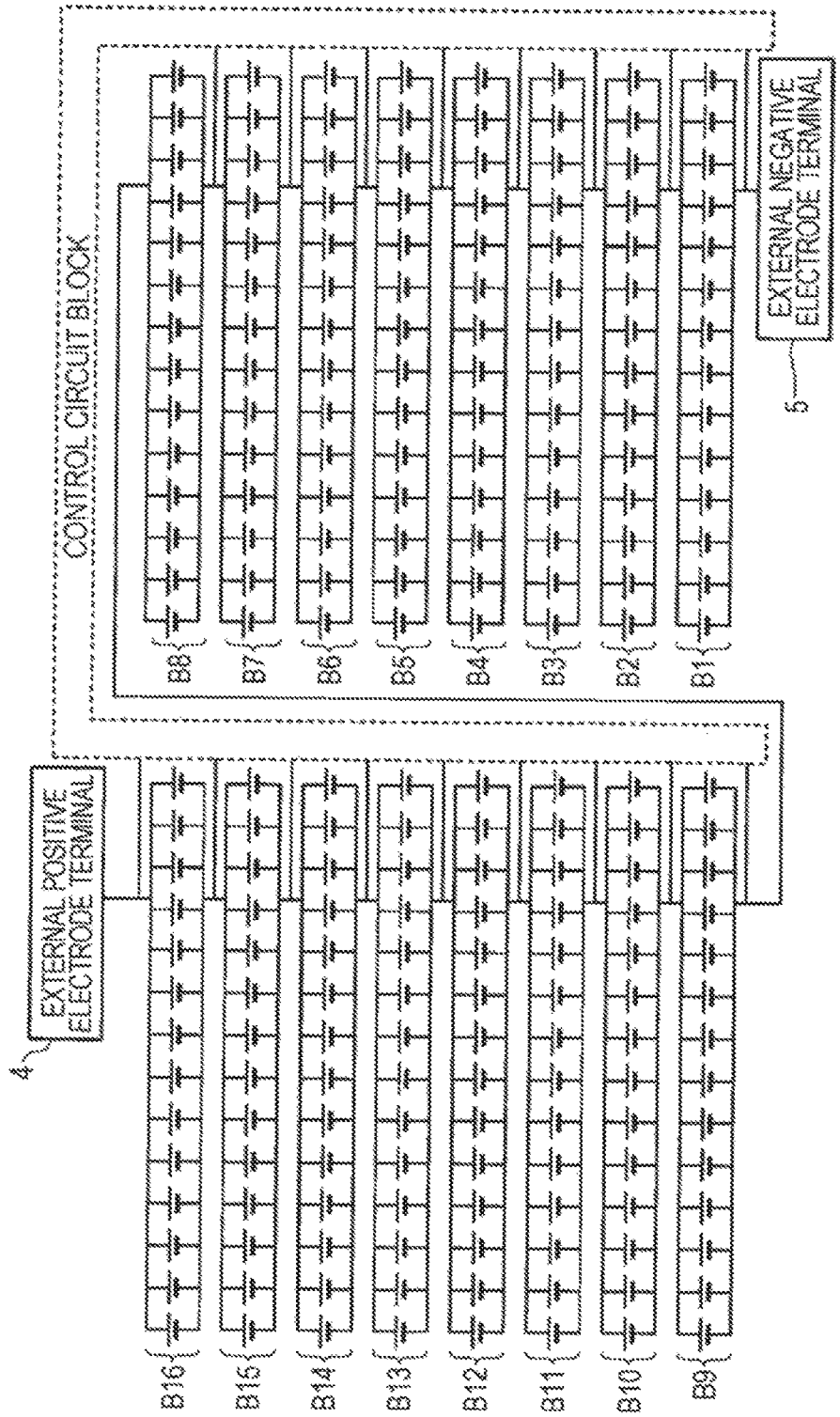
FIG. 3 is a block diagram illustrating an outline of an electric configuration of a power storage device according to a first embodiment of the present technology.
Figure 4:
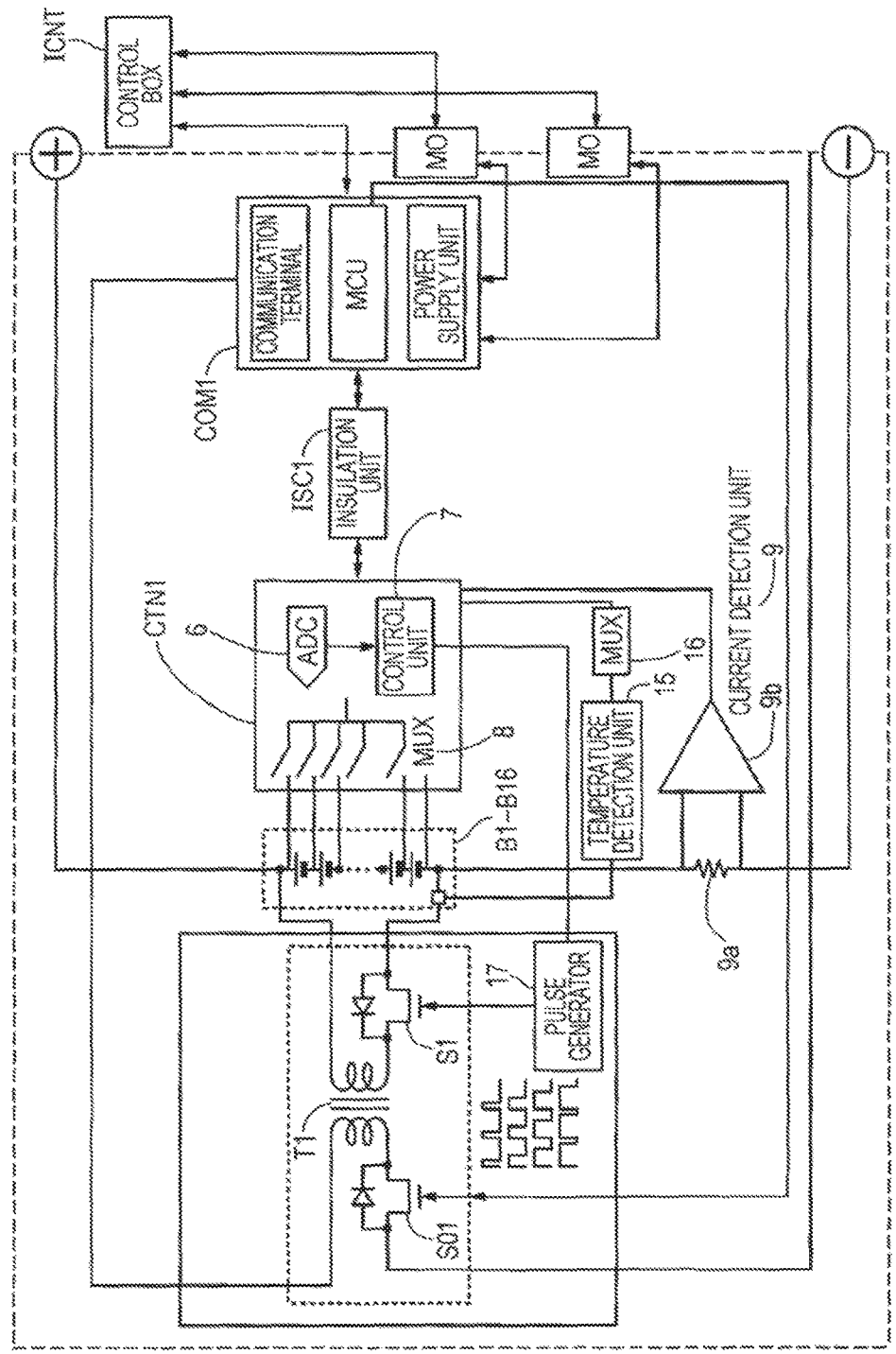
FIG. 4 is a block diagram illustrating an example of an electric configuration of a power storage device according to the first embodiment of the present technology.

A configuration example of a power storage device according to a first embodiment of the present technology will now be described with reference to the drawings. FIG. 1 is a perspective view illustrating an exterior view of the power storage device. FIG. 2 is a sectional view taken along a line A-A' in FIG. 1. In FIG. 2, illustration of members other than an armoring case, a battery case, battery cells, and a partition plate is omitted. FIG. 3 illustrates an outline of an electric configuration of a power storage device according to the first embodiment of the present technology. FIG. 4 illustrates an outline of an electric configuration of a power storage device according to the first embodiment of the present technology.

As illustrated in FIG. 1, a power storage device 1 includes an armoring case 20. The armoring case 20 is a casing taking the shape of a substantially rectangular parallelepiped and including a front face unit 20a, a rear face unit 20b, a top face unit 20c, a bottom face unit 20d, and two side face units 20e and 20f. As for a material of the armoring case 20, it is desirable to use a material having a high thermal conductivity and a high emissivity. In other words, it is desirable to use a material having a high thermal conductivity and a high emissivity for the front face unit 20a, the rear face unit 20b, the top face unit 20c, the bottom face unit 20d, and the two side face units 20e and 20f. As a result, it is possible to obtain excellent thermal dissipation of the casing and it is possible to suppress the temperature rise in the armoring case 20. For example, each of the front face unit 20a, the rear face unit 20b, the top face unit 20c, the bottom face unit 20d, and the two side face units 20e and 20f included in the armoring case 20 is a plate-like body or a body obtained by shape machining on a plate-like body. The plate-like body is, such as, a metal plate of aluminum, an aluminum alloy, copper, or a copper alloy.

The front face unit 20a included in the casing is covered by a protection cover 21. The protection cover 21 includes an insulation material having an electric insulation property such as, a resin. It is possible to secure insulation between a connection member, which electrically connects a plurality of power storage devices 1 such as, bus bars, and the front face unit 20a, by covering the front face unit 20a with the protection cover 21 including a material having insulation. The power storage device 1 can be placed with a face other than the front face unit 20a set as a bottom face. In other words, the power storage device 1 can be placed with the rear face unit 20b, the top face unit 20c, the bottom face unit 20d, the side face unit 20e, or the side face unit 20f set as the bottom face.

As illustrated in FIG. 2, a battery unit 51, a battery unit 52, and a board and the like on which a control circuit block and the like are mounted (not illustrated in FIG. 2) are accommodated in the armoring case 20 of the power storage device 1. Each of the battery unit 51 and the battery unit 52 includes a battery block group 10 including a plurality of battery cells 10a and members, such as partition plates 93 inserted between lines each including a plurality of battery cells 10a arranged in a line form and a connection terminal unit 91 (not illustrated in FIG. 2) which electrically connects a plurality of battery cells 10a, accommodated in a battery case 61 including a top case 61a and a bottom case 61b.

The side face unit 20e on this side and the side face unit 20f on a back side in the armoring case 20 are, for example, rectangular shaped plate-like bodies. The battery unit 51 is fixed to the side face unit 20f, and the battery unit 52 is fixed to the side face unit 20e. Although illustration is omitted, the battery unit 51 is fixed to the side face unit 20f by, for example, inserting a plurality of convex shaped fitting units provided on the side face unit 20f into a plurality of hole-shaped fitting units provided on a bottom face unit of the bottom case 61b. The battery unit 52 is fixed to the side face unit 20e by inserting a plurality of convex or the like shaped fitting units provided on the side face unit 20e into a plurality of hole-shaped fitting units provided on a bottom face unit of the bottom case 61b.

The battery block group 10 includes, for example, a plurality of battery blocks connected in series, and one battery block includes a plurality of battery cells 10a connected in parallel. The battery cell 10a is a secondary battery such as, a cylindrical lithium ion secondary battery. The battery cell 10a is not limited to the lithium ion secondary battery.

For example, the battery unit 51 and the battery unit 52 are two-stage stacked in the horizontal direction in a vertical mounting state with a bottom face unit and a top face unit of the battery case 61 being directed in the horizontal direction, and accommodated in the armoring case 20. Although details will be described later, a gap S is provided between opposite faces of the battery unit 51 and the battery unit 52 which are stacked.

As illustrated in FIG. 3, for example, battery blocks B1 to B16 each including fourteen battery cells 10a connected in parallel are connected in series and accommodated in the battery unit 51 and the battery unit 52. A battery block group 10 including the battery blocks B1 to B8 is accommodated in the battery unit 51. A battery block group 10 including the battery blocks B9 to B16 is accommodated in the battery unit 52. The number of battery cells 10a included in each battery block is not limited to fourteen. Furthermore, the number of battery blocks included in each battery block group 10 is not limited to the above-described number, either.

In the battery unit 51 and the battery unit 52, a connection terminal unit 91, which is a member for connection having electrical conductivity, is used to connect battery cells 10a to each other and to connect battery cells 10a to adjacent battery blocks in series and/or in parallel. The connection terminal unit 91 is a plate-like body including a material having electrical conductivity, such as, metal. Details of a configuration of the connection terminal unit 91 will be described later.

The battery blocks B1 to B16 are connected to a control circuit block (hereafter referred to as control block) and controlled to charge or discharge by the control block. The charging and discharging are performed via an external positive electrode terminal 4 and an external negative electrode terminal 5. For example, one power storage device 1 outputs (16×3.2 V=51.2 V).

The control block is provided in the power storage device 1 in order to monitor the voltage, current and temperature of the battery cells 10*a*. Information from the control block is transmitted to an external controller by communication. The external controller performs charge management, discharge management, and management for deterioration suppression and the like. For example, the control block monitors the voltage of each battery block, converts the detected voltage to a digital signal, and transmits the digital signal to a control box ICNT which is the external controller. The control block may detect the temperature of each battery block in addition to the voltage, convert the temperature to digital data, and transmit the digital data to the control box ICNT.

FIG. 4 illustrates an example of the control block. As illustrated in FIG. 4, a voltage across sixteen battery blocks B1 to B16 connected in series and a voltage across each battery block are detected. A multiplexer 8 (MUX 8) is provided to output the voltage across the battery blocks B1 to B16 and the voltage across each battery block in order.

The MUX 8 switches the channel in accordance with, for example, a predetermined control signal, and selects one analog voltage data out of n analog voltage data. The analog voltage data selected by the MUX 8 is supplied to an Analog to Digital Converter (ADC) (A/D converter) 6.

The ADC 6 converts the analog voltage data supplied from the MUX 8 to digital voltage data. For example, the analog voltage data is converted to digital voltage data in the range of 14 to 18 bits. The digital voltage data from the ADC 6 is supplied to a communication unit COM1. The communication unit COM1 is controlled by a control unit 7 to perform communication with an external device connected through a communication terminal. For example, the communication unit COM1 performs communication with another power storage device MO through the communication terminal, and performs communication with the control box ICNT through the communication terminal. In addition, the communication unit COM1 receives a control signal from the control box ICNT through the communication terminal. In this way, the communication unit COM1 performs bidirectional communication.

In addition, the control unit 7 controls homogenization of voltages of the battery blocks B1 to B16. Such control is referred to as cell balance control. For example, in a case where one battery block among the plurality of battery blocks B1 to B16 reaches a discharge voltage that is a lower limit of use, other battery blocks that still have a remaining capacity exist. In a case where charging is performed the next time, other battery blocks that still had a remaining capacity reach an upper limit charge voltage earlier and consequently charging is not performed up to full charge. In order to avoid such unbalance, battery blocks having a remaining capacity are forcibly discharged by turning on a Metal Oxide Semiconductor Field Effect Transistor (MOSFET). The system of cell balance control is not limited to the above-described passive system, but the so-called active system or other various systems can be applied.

A pulse generator 17 supplies a control pulse to a switch (MOSFET) S1 provided on a primary side of a flyback transformer T1 in a module balance control circuit, which controls voltage balance among the power storage device 1 and a plurality of power storage devices MO. The pulse generator 17 generates the control pulse in accordance with a control signal supplied from the control unit 7 in a module controller CTN1. For example, the pulse generator 17 outputs a control pulse subjected to pulse width modulation. A MicroController Unit (MCU) in the communication unit COM1 supplies a control pulse to a switch (MOSFET) S01 provided on a secondary side of the flyback transformer T1.

The control box ICNT determines a sequence of balance between power storage device on the basis of voltage information of the each power storage device 1 and the power storage devices MO. The control box ICNT transmits whether to perform charging or discharging for balance between power storage devices, to the MCU in each power storage device. The MCU supplies a control signal directly to the secondary side of the flyback transformer or transmits a control signal to the primary side of the flyback transformer T1 by using insulation communication via an insulation unit ISC1.

A temperature detection unit 15 includes a temperature detection element such as a thermistor. Analog temperature data T which indicates the temperature of each of the battery blocks B1 to B16 detected by the temperature detection unit 15 is supplied to a cell temperature multiplexer 16 (MUX 16). For example, analog temperature data T1 which indicates the temperature of the battery block B1 is supplied to the MUX 16. Analog temperature data T2 which indicates the temperature of the battery block B2 is supplied to the MUX 16. In the same way, analog temperature data T3 to analog temperature data T16 respectively indicating the temperatures of the battery block B3 to the battery block B16 are supplied to the MUX 16.

The MUX 16 switches a channel in accordance with a predetermined control signal, and selects one analog temperature data T out of sixteen analog temperature data T1 to analog temperature data T16. Further, one analog temperature data T selected by the MUX 16 is supplied to the ADC 6.

A current detection unit 9 detects values of currents flowing through a plurality of battery blocks B1 to B16. The current detection unit 9 includes, for example, a current detection resistor 9*a* and a current detection amplifier 9*b*. Analog current data which indicates a value of voltage across the current detection resistor 9*a* is detected by the current detection resistor 9*a*. The analog current data is detected at all times no matter whether charging or discharging is being performed. The analog current data may be detected at a predetermined period.

The detected analog current data is supplied to the current detection amplifier 9*b*. The supplied analog current data is amplified by the current detection amplifier 9*b*. The amplified analog current data is supplied to the ADC 6.

The ADC 6 converts the analog current data supplied from the current detection amplifier 9*b* to digital current data. The analog current data is converted to the digital current data by the ADC 6, and the digital current data is output.

For example, in a case where the module controller CTN1 detects that an excessively large current flows at the time of discharging, the module controller CTN1 determines that a discharge overcurrent state is brought about and performs control to cause a switch (not illustrated) to assume an open state (a state in which the current is interrupted). On the other hand, in a case where the module controller CTN1 detects that an excessively large current flows at the time of charging, the module controller CTN1 performs control to cause a switch (not illustrated) to assume an open state (a state in which the current is interrupted).

The insulation unit ISC1 has a function of giving insulation between the communication unit COM1 and the module controller CTN1. In other words, reference potential of a power supply of the communication unit COM1 and reference potential of a power supply of the module controller CTN1 are separated from each other and are made independent from each other. In addition, in the insulated state, the insulation unit ISC1 has a function of supplying a power supply voltage to the module controller CTN1 and a function of serving as a transmission medium of bidirectional communication.

As for a system of bidirectional communication performed through the insulation unit ISC1, it is possible to use standards of CAN. As for a system of power transmission performed through the insulation unit ISC1, an electromagnetic induction system, a magnetic resonance system, a radio wave reception system and the like can be used.

In the first embodiment, for example, a non-contact IC card technology is used. In the non-contact IC card technology, an antenna coil in a reader/writer and an antenna coil in a card are magnetic-flux-coupled, and communication and power transmission are performed between the reader/writer and the card. As for the communication, a system of performing Amplitude Shift Keying (ASK) modulation on a carrier wave having a frequency of 13.56 kHz is used, and communication is performed at a velocity of 212 or 424 kbps. The insulation unit ISC1 is provided in accordance with specifications similar to those of the non-contact IC card system. In addition, for example, the insulation unit ISC1 is adapted to perform communication and power transmission between antennas (coils) formed in different layers of a multilayer printed circuit board.

(Front End Unit of Power Storage Device)

Figure 5:
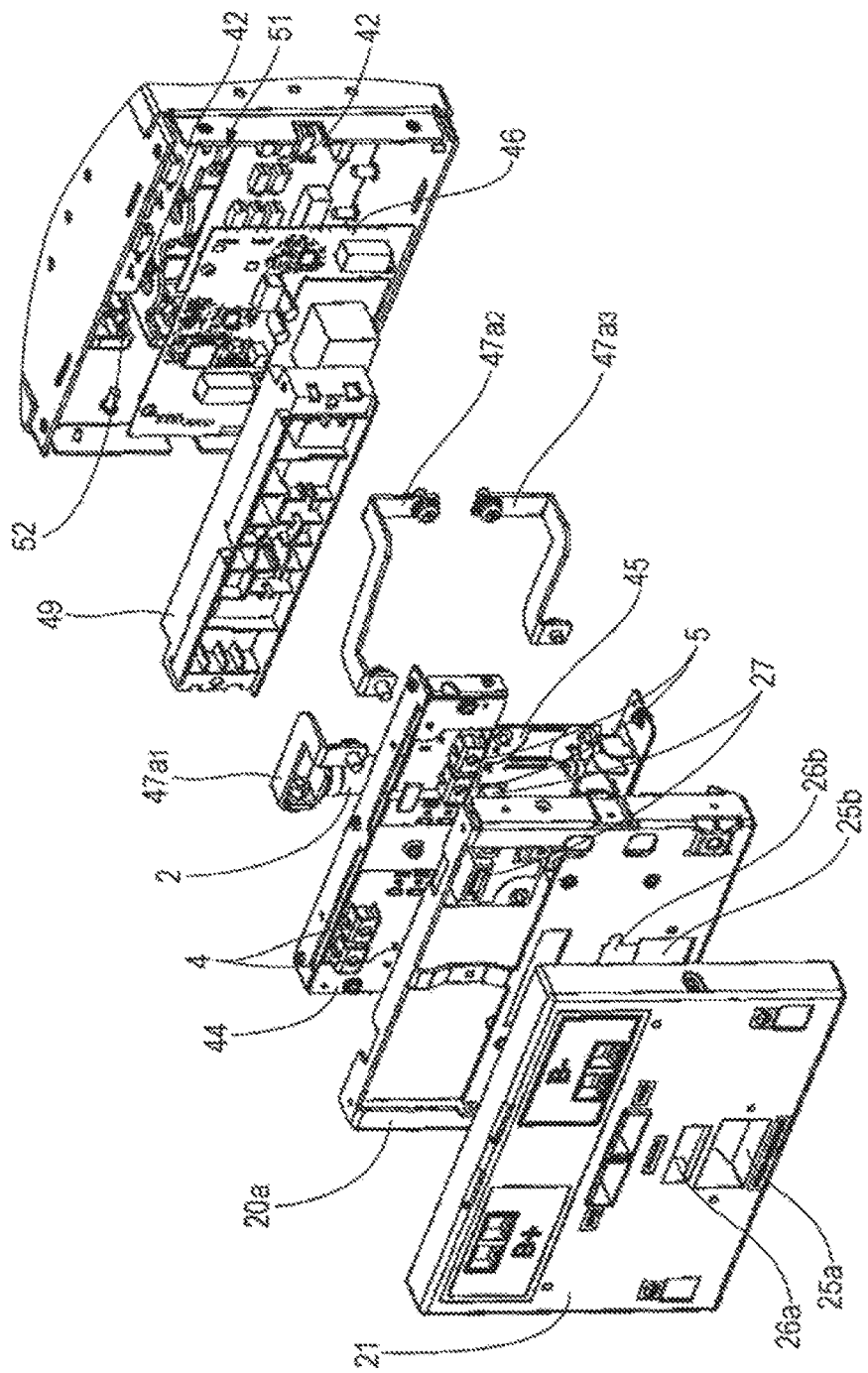
FIG. 5 is an exploded perspective view illustrating a configuration of a front end unit of a power storage device.
Figure 6:
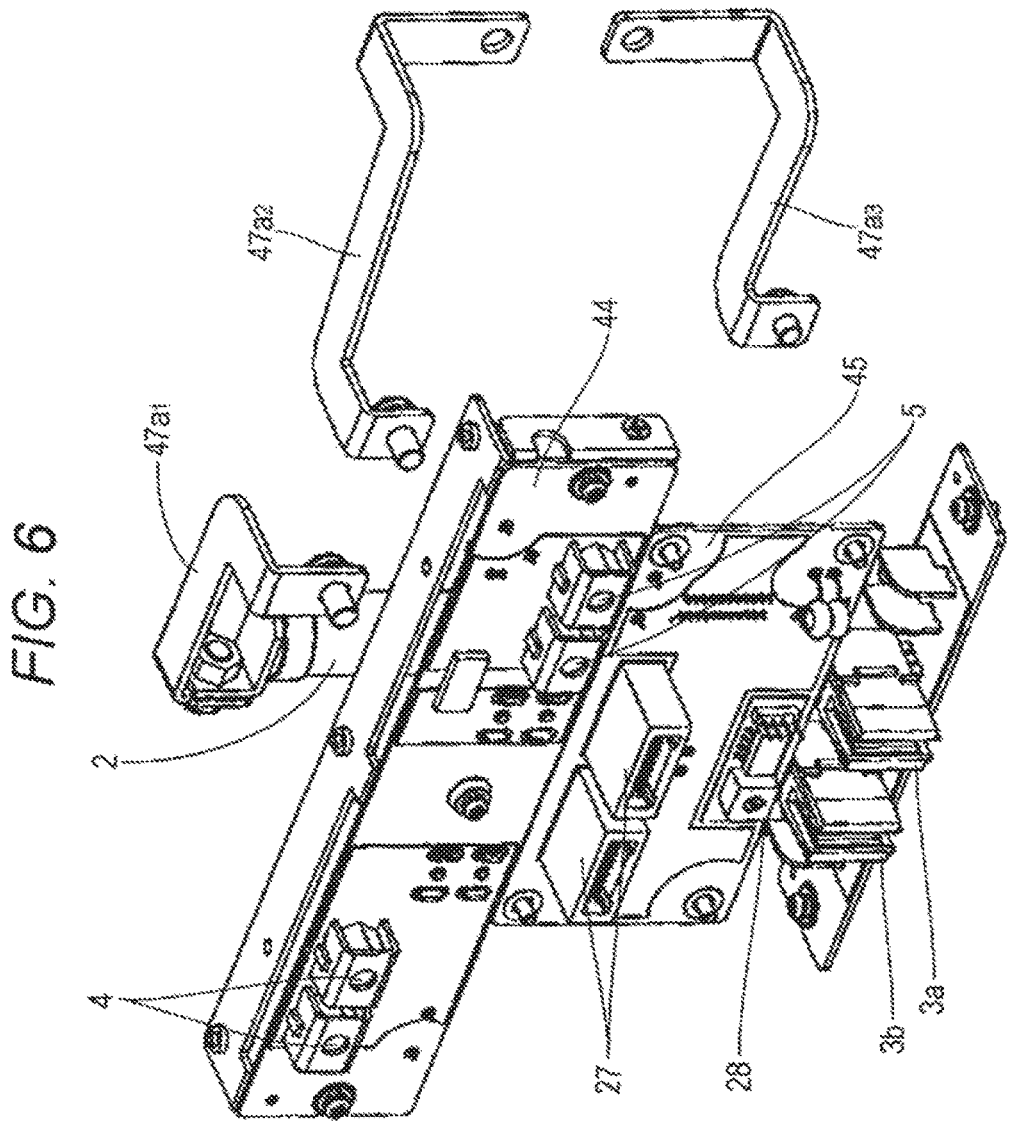
FIG. 6 is a perspective view illustrating a member detached together with a front face unit.
Figure 7:
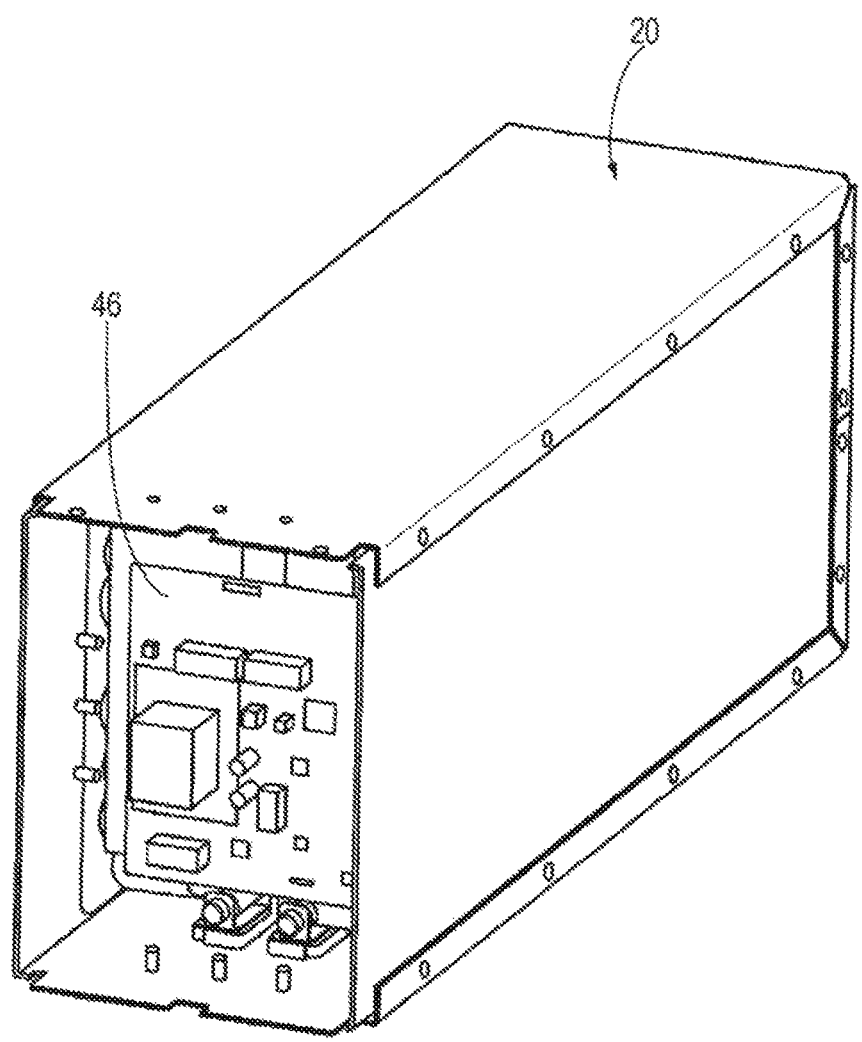
FIG. 7 is a perspective view illustrating a state in which a front face unit is detached.

FIG. 5 is an exploded perspective view illustrating a configuration of a front end unit of the power storage device. FIG. 6 is a perspective view illustrating a member detached together with the front face unit. FIG. 7 is a perspective view illustrating a state in which the front face unit is detached.

As illustrated in FIG. 5, the front face unit 20a is covered by the protection cover 21. On an inner face side of the front face unit 20a, a space which accommodates a component group including a board and the like is secured. A component group including at least an external communication board 45 and an output terminal board 44 illustrated in FIG. 6 is disposed and fixed in the space. Specifically, the component group includes members including, for example, an output terminal board 44 having an external positive electrode terminal 4 and an external negative electrode terminal 5 serving as output terminals, an external communication board 45, a fuse 2, bus bars 47a1 to 47a3, a board holding member 49, and connectors 3a and 3b. The external communication board 45 and the output terminal board 44 are connected to a main board 46 by connectors (not illustrated). The board holding member 49 includes a material having an insulation property such as resin. The board holding member 49 plays a role of performing mechanical holding of boards and giving insulation between boards and between a board and components. Furthermore, two sub boards 42 are fixed to the battery unit 51 and battery unit 52, respectively. For example, the sub boards 42 are disposed and fixed with one main face of the sub boards opposed to one wall face that is included in four wall faces of the battery case 61 and that is perpendicular to a line direction of a battery line and a unit of the main face of the sub boards in close contact with the one wall face. The control block including a monitor and control circuit illustrated in FIG. 3 and FIG. 4 is mounted on the sub boards 42, the output terminal board 44, the external communication board 45, and the main board 46. A component group including a plurality of boards configured separately is disposed in a space between the inner face of the front face unit 20a and the front wall faces of the battery unit 51 and the battery unit 52, and the components are connected by connection members such as plate-like members like bus bars 47a1 to 47a3 and connectors. Therefore, connection between boards can be performed simply. Such a power storage device 1 is efficient and excellent in assembly property. In addition, higher energy because of space saving can be implemented.

When the front face unit 20a covered by the protection cover 21 is detached, the above-described component group including at least the external communication board 45 and the output terminal board 44 fixed to the front face unit 20a is detached as one body together with the front face unit 20a. When the front face unit 20a and the component group are detached, a portion including the main board 46 disposed on a rear side as compared with the component group faces to external from an opening of the armoring case 20 with the front face unit 20a removed, as illustrated in FIG. 7. It becomes possible to put hands into the inside from the opening to perform works such as maintenance work of the main board 46 or take out the main board 46 swiftly. As a result, it becomes possible to perform maintenance and the like of the main board 46 by only detaching the front face unit 20a and the component group detached as one body together with the front face unit 20a. Therefore, maintenance property can be improved. In other words, maintenance and inspection and exchange of components included in the component group can be performed simply. Furthermore, it is possible to eliminate necessity of taking out complicated wiring and re-disposing of wiring.

The external positive electrode terminal 4 and the external negative electrode terminal 5 provided to charge and discharge the power storage device 1 are exposed to the external through openings provided through the protection cover 21 and the front face unit 20a.

Furthermore, in the front face unit 20a and the protection cover 21 of the power storage device 1, windows 25a, 25b, 26a and 26b which are close to each other are formed through the protection cover 21 and the front face unit 20a. As illustrated in FIG. 1, the windows 25a, 25b, 26a and 26b are covered by a short bar 11 at the time of operation of the power storage device 1.

Figure 8:
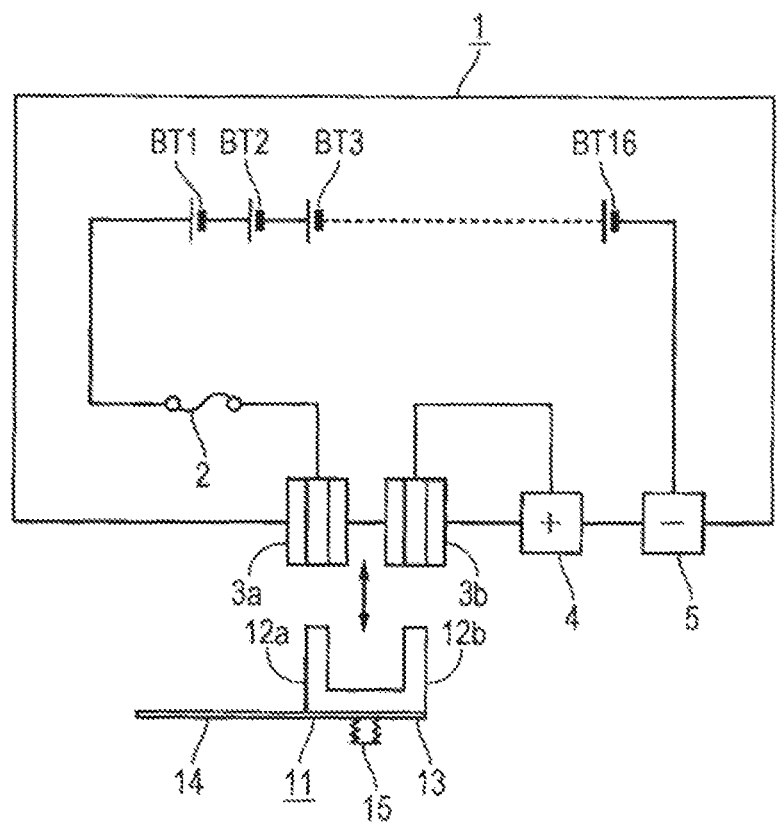
FIG. 8 is a block diagram illustrating an outline of an electric configuration of a power storage device according to the first embodiment of the present technology.

Connectors 3a and 3b are provided inside the windows 25a and 25b formed on the front face unit 20a. As illustrated in FIG. 8, a terminal on a positive electrode side of the battery blocks B1 to B16 connected in series is connected to the connector 3a via the fuse 2 which is a current interruption element. The other connector 3b is provided near the connector 3a. The connector 3b is connected to the external positive electrode terminal 4. A terminal on a negative electrode side of the battery blocks B1 to B16 is connected to the external negative electrode terminal 5.

The short bar 11 which can be freely inserted and removed is provided as a connection unit for the connectors 3a and 3b. A conductive plate of the short bar 11 is bent to have a pair of plate-like projections 12a and 12b, and a base portion of the conductive plate is attached to one face of a support plate 13. A cover 14 is formed by extending one end of the support plate 13. In addition, a knob 15 is formed on the other face of the support plate 13. The support plate 13 having the cover 14 and the knob 15 is, for example, a molded article of synthetic resin.

Each of the connectors 3a and 3b has two spring contact plates disposed to be opposite to each other. The plate-like projections 12a and 12b of the short bar 11 are inserted into gaps each between the two spring contact plates through the windows 25a and 25b. In addition, the windows 26a and 26b are blocked up by the cover 14 which is integral with the support plate 13 of the short bar 11. Since the plate-like projections 12a and 12b are sandwiched between the two spring contact plates of the connectors 3a and 3b, respectively, it is possible to hold the insertion state of the short bar 11 into the connectors 3a and 3b.

The connector 3a and the connector 3b are connected (made conductive) to each other by the short bar 11, by inserting the plate-like projections 12a and 12b of the short bar 11 into the gaps of the connectors. On the other hand, the connector 3a and the connector 3b are disconnected (made nonconductive) from each other by pulling the plate-like projections 12a and 12b of the short bar 11 from the gaps of the connectors. In this way, it is possible to switch between a connection state in which the short bar 11 is inserted into the connectors 3a and 3b and a non-connection state in which the short bar 11 is pulled out from the connectors 3a and 3b.

An electronic component 28 to be used for setting or connection is disposed on the inside of the windows 26a and 26b formed through the front face unit 20a. The electronic component 28 is, for example, a slide switch, a rotary switch, a JTAG connector, and the like. For example, an address for the power storage device 1 is set by using the rotary switch. In other words, it is made possible to connect and use a plurality of power storage devices 1. In a case where a plurality of power storage devices 1 is connected, an address for identification is set to each of the power storage devices. The external controller performs control processing on the basis of the address. The slide switch is used to increase addresses specified by the rotary switch.

The JTAG connector is a standard connector proposed by Joint European Test Action (JTAG). Test data is input and output through the JTAG connector to inspect a Micro Processing Unit (MPU), Integrated Circuits (ICs) and the so forth within the case. Furthermore, rewriting on firmware of the internal MPU is performed through the JTAG connector. As electronic components, switching components, connectors and the like besides the above-described elements may be used.

In the connection state in which the short bar 11 is inserted into the connectors 3a and 3b, the cover 14 closes the windows 25a, 25b, 26a and 26b in front of an operation face of electronic components. In other words, in the connection state, access to the electronic components is obstructed. On the other hand, when the short bar 11 is pulled out from the connectors 3a and 3b, the windows in front of the operation face of the setting unit are opened and, for example, an address of the power storage device 1 can be set by operating the operation face through the windows 25a, 25b, 26a, and 26b.

Only in the case where the short bar 11 is detached to open the windows 25a, 25b, 26a, and 26b in the front of the operation face, access to the operation face becomes possible and setting operation on the electronic components becomes possible. The work efficiency can be improved and the safety can be enhanced as compared with operating electronic components within the case, by setting operation from outside of the armoring case 20.

In addition, a connector 27 which is a communication terminal to be used in communication with the external controller is provided in the power storage device 1. As described above, the control block is provided in the power storage device 1 to monitor the voltage, current and temperature of batteries. Information from the control block is transmitted to the external controller by communication. The external controller performs charging management, discharging management, and management for degradation suppression and the like.

As for the communication with the external controller performed via the connector 27, for example, a serial interface is used. As the serial interface, specifically a System Management Bus (SM bus) or the like is used. For example, an I2C bus can be used. The I2C bus is synchronous serial communication in which communication is performed by using two signal lines, i.e., SCL (serial clock) and bidirectional SDA (serial data).

(Battery Unit)

Figure 9:
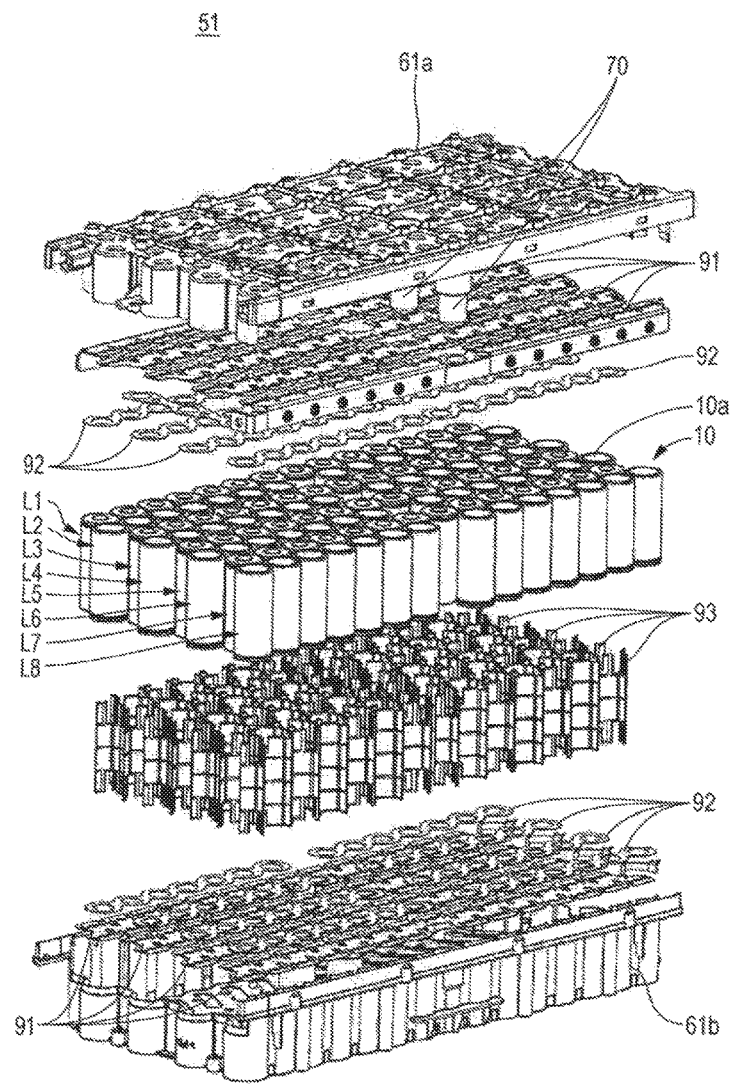
FIG. 9 is an exploded perspective view illustrating a configuration example of a battery unit.

FIG. 9 is an exploded perspective view illustrating a configuration example of the battery unit. In the battery unit 51, the battery block group 10 including a plurality of battery cell blocks, the partition plates 93, the connection terminal units 91, and positive electrode insulation sheets 92 are accommodated in a battery case 61 including the top case 61a and a bottom case 61b. The battery unit 52 has a configuration similar to that of the battery unit 51. Hereafter, therefore, the configuration of the battery unit 51 will be described in detail, and detailed description of the configuration of the battery unit 52 will be omitted.

(Battery Case)

The battery case 61 includes the top case 61a and the bottom case 61b. The battery case 61 is, for example, a molded article of resin having an electric insulation property.

Figure 10:
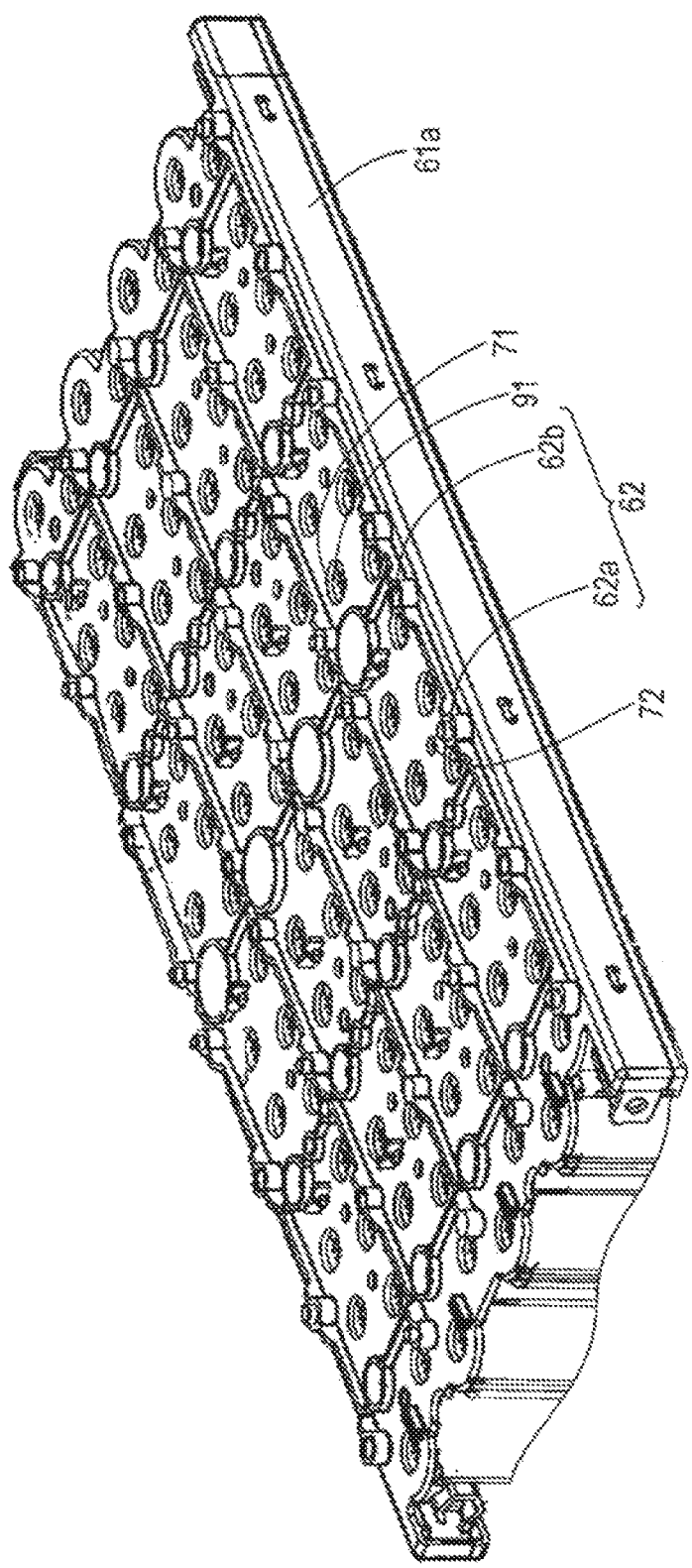
FIG. 10 is a perspective view illustrating a configuration example of a top case.

FIG. 10 is a perspective view illustrating a configuration example of the top case 61a. The top case 61a includes a top face unit and a wall unit erected around the top face part. A plurality of openings 71 where the connection terminal units 91 disposed on a terminal face of a plurality of battery cells 10a is exposed is provided on the top face unit of the top case 61a. Furthermore, a plurality of holes 72 into which projection units 93a of the partition plates 93 described later are fit is provided on the top face unit of the top case 61a. Furthermore, a plurality of fitting units 62 is projected from the top face unit of the top case 61a. As a result of providing a plurality of projected fitting units 62, it is possible to form the gap S between the battery unit 51 and the battery unit 52 which are opposed to each other. In addition, it is possible to stably maintain a state in which the battery unit 51 and the battery unit 52 are combined to hold the gap S. Although illustration is omitted, holes used to insert thermistors may be provided on the top face unit of the top case 61a.

The bottom case 61b includes a bottom face unit and a wall unit erected around the bottom face unit. Although illustration is omitted, four hollow structures are provided in the center of the bottom face unit in a line form. In a state in which the bottom case 61b is combined with the top case 61a, the four hollow structures are fitted to hollow structures 70 of the top case 61a. Each of the hollow structures of the bottom case 61b is, for example, a structure that has a hollow structure, and takes a hollow cylinder shape, and has an opening on the upper face and has a hole in the center of the bottom face. The hole is fitted to the projection unit provided on the side face unit 20f, and screwing is performed as occasion demands, and the battery unit 51 is fixed to the side face unit 20f. Although illustration is omitted, a plurality of openings 71 where connection terminal units 91b are exposed is provided on the bottom face unit of the bottom case 61b, in the same way as the top face unit of the top case 61a. Furthermore, a plurality of holes 72 is provided on the bottom face unit of the bottom case 61b to fit to the projection units 93a of the partition plates 93 which will be described later.

FIG. 11 is a perspective view illustrating a state before the two battery units are combined. When the battery unit 51 and the battery unit 52 are combined, the top face unit of the top case 61a of the battery unit 51 and the top face unit of the top case 61a of the battery unit 52 are opposed to each other, and the fitting units 62 projected on corresponding one top face unit are fitted to the fitting units 62 projected on the other top face unit, as illustrated in FIG. 11.

The fitting units 62 include, for example, convex shaped fitting units 62a and concave shaped fitting units 62b. The fitting units 62 are arranged in a line form and disposed to have the convex shaped fitting units 62a and the concave shaped fitting units 62b which are line symmetrical about a center line along a longitudinal direction of the top face unit serving as a symmetry axis. Owing to such an arrangement, in a state in which the top face units of the same top cases 61a are opposed, it is possible to make positions of fitting units having different shapes correspond to each other to fit the convex shaped fitting units 62a of one of the top face units to the concave shaped fitting units 62b of the other of the top face units and fit the concave shaped fitting units 62b of one of the top face units to the convex shaped fitting units 62a of the other of the top face units. In a state in which the battery unit 51 and the battery unit 52 are combined, therefore, it is possible to fit the convex shaped fitting units 62a of one of the top face units to the concave shaped fitting units 62b of the other of the top face units and fit the concave shaped fitting units 62b of one of the top face units to the convex shaped fitting units 62a of the other of the top face units.

Figure 12A:
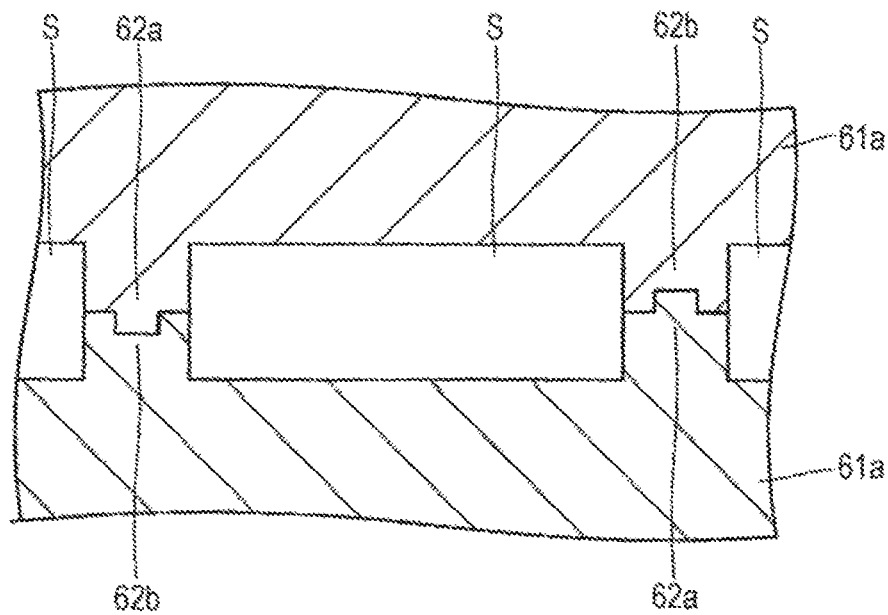
FIG. 12A is a schematic sectional view illustrating a state after two battery units are combined.

A plurality of fitting units 62 is projected from the top face unit of the top case 61a. As a result, the top face unit of the top case 61a includes convex portions including the fitting units 62 and a plane including portions other than the fitting units 62. In a state in which the battery unit 51 and the battery unit 52 are combined, the erected fitting units 62a and 62b are brought into contact each other and fitted as illustrated in FIG. 12A. As a result, the gap S having an interval corresponding to heights of the fitted fitting units 62a and 62b is formed between planes of the top face units of the opposed top cases 61a of the battery unit 51 and the battery unit 52. This gap S improves emission of high temperature gas generated by the battery cell 10a to the external when a safety mechanism or the like of the battery cell 10a is activated at the time of abnormality. As a result, thermal emission is improved, and consequently the safety can be improved.

Figure 12B:
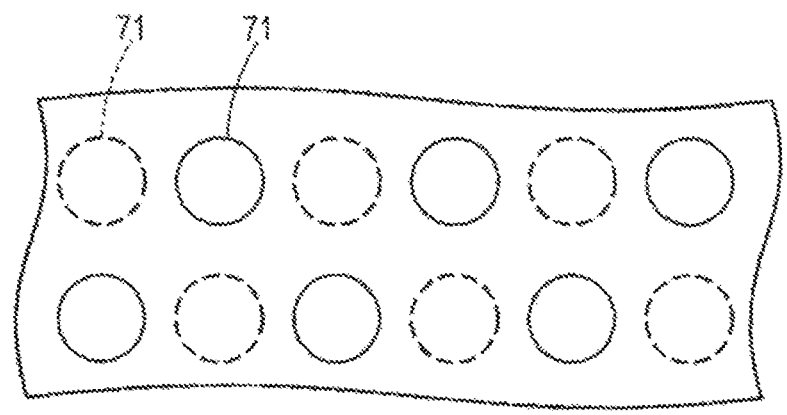
FIG. 12B is a schematic plane diagrams illustrating disposition relations of openings.

Furthermore, in a state in which the battery unit 51 and the battery unit 52 are combined, a configuration is taken to prevent openings 71 (indicated by dashed lines) where connection portions between the connection terminal unit 91 of the battery unit 51 and the terminal face of the battery cell 10a are exposed and openings 71 (indicated by solid lines) where connection portions between the connection terminal unit 91 of the battery unit 52 and the terminal face of the battery cell 10a from overlapping in the stacking direction as illustrated in FIG. 12B. In such a configuration, a position where high temperature gas generated by the battery cell 10a in the battery unit 51 which is one of the opposed battery units is directly applied is deviated from the battery cell 10a in the battery unit 52 which is the other of the opposed battery units. Therefore, it is possible to avoid that high temperature gas generated by one battery cell 10a directly strikes against the other opposed battery cell 10a. As a result, thermal influence of high temperature gas generated by one battery cell 10a upon the other opposed battery cell 10a can be reduced.

(Battery Block Group)

Referring back to FIG. 9, the battery block group 10 has, for example, a configuration in which battery lines each including a plurality of battery cells 10a arranged in a straight line form is arranged in parallel in a direction substantially perpendicular to the line direction of the battery line. Each of the battery lines includes, for example, fourteen batteries.

The plurality of battery cells 10a included in the battery block group 10 is connected electrically by the connection terminal unit 91. For example, each of battery blocks B1 to B8 is a battery line including a plurality of battery cells 10a connected in parallel. In addition, the battery block group 10 is formed by connecting the battery blocks B1 to B8 in series.

Although illustration is omitted, the battery block group 10 accommodated in the battery case 61 of the battery unit 52 also has a similar configuration. For example, the battery line L1 to the battery line L8 become battery blocks B9 to B16 each including a plurality of battery cells 10a connected in parallel. In addition, the battery block group 10 is formed by connecting the battery blocks B9 to B16 in series.

In the battery block group 10, a plurality of battery lines (battery lines L1 to L8) each having a plurality of battery cells 10a connected in parallel is arranged in a direction substantially perpendicular to the line direction and connected in series. Accordingly, the current path can be rectified in a single direction (for example, a direction substantially perpendicular to the line direction of the battery lines), and the total length of the current path can be shortened. As a result, an increase of the resistance value can be suppressed.

In the battery block group 10, the battery line L1 and the battery line L2 are arranged to be opposed to each other, the battery line L2 and the battery line L3 are arranged to be opposed to each other, the battery line L3 and the battery line L4 are arranged to be opposed to each other, the battery line L4 and the battery line L5 are arranged to be opposed to each other, the battery line L5 and the battery line L6 are arranged to be opposed to each other, and the battery line L7 and the battery line L8 are arranged to be opposed to each other. In the battery lines L1, L3, L5 and L7, each of a plurality of battery cells 10a included in each battery line is disposed to have a positive electrode terminal face on its top face and a negative electrode terminal face on its bottom face. In the battery lines L2, L4, L6 and L8, each of a plurality of battery cells 10a included in each battery line is disposed to have a negative electrode terminal face on its top face and a positive electrode terminal face on its bottom face.

In the odd-numbered battery lines L1, L3, L5 and L7, a plurality of battery cells 10a included in each battery line is disposed side by side in a straight line form and in a closed contact state. In the example illustrated in FIG. 9, in the odd-numbered battery lines L1, L3, L5 and L7, fourteen battery cells 10a included in each battery line are disposed side by side in a straight line form and in a closed contact state.

On the other hand, in the even-numbered battery lines L2, L4, L6 and L8, a plurality of battery cells 10a included in each battery line is disposed to make it possible for a space substantially corresponding to one battery cell 10a to be provided between two sets of battery cells 10a disposed side by side in a straight line form and in a closed contact state. The space substantially corresponding to one battery is preferred to be provided on a position, for example, opposed to a center of the adjacent and opposed battery line L2, L4, L6 or L8.

In the even-numbered battery lines L2, L4, L6 and L8, fourteen battery cells 10a included in each battery line are disposed to make it possible for a space corresponding to one battery cell 10a to be provided between two sets of seven battery cells 10a disposed side by side in a straight line form and in a closed contact state. The space substantially corresponding to one battery is provided on a position, for example, opposed to a center of the adjacent and opposed battery line L1, L3, L5 or L7.

A hollow structure (not illustrated) of the bottom case 61b and the hollow structure 70 of the top case 61a opposed to the hollow structure are fitted in the space substantially corresponding to one battery cell 10a. As described above, a hole is provided on the bottom face of the hollow structure of the top case 61a, a projection of the side face unit 20f is fitted into the hole and screwing is performed as occasion demands, and the battery unit 51 is fixed to the side face unit 20f. Since a fixing unit to the side face unit 20f is provided near the center of the battery unit 51, it is possible to prevent swelling out from occurring near the center of the battery unit 51 by deviation or the like of the battery cells 10a included in the battery block group 10.

In the battery block group 10 including the battery lines L1 to L8, adjacent battery lines are deviated from each other in the line direction by substantially the same length as a radius of an outer circumference of the battery cell 10a, resulting in a straw bag stacking arrangement. The straw bag stacking arrangement includes an arrangement in which substantially centers of end faces of two adjacent battery cells 10a in one line and substantially a center of a battery cell 10a which is in another line adjacent to the one line and which comes in between the two adjacent battery cells 10a in the one line takes the shape of a substantially regular triangle.

In the straw bag stacking arrangement, it is possible to accommodate a larger number of battery cells 10a in the battery case 61 having a limited space. Therefore, the number of battery cells per area can be increased and the energy density of the power storage device 1 can be improved.

(Connection Terminal Unit on Top Case Side)

Figure 13:
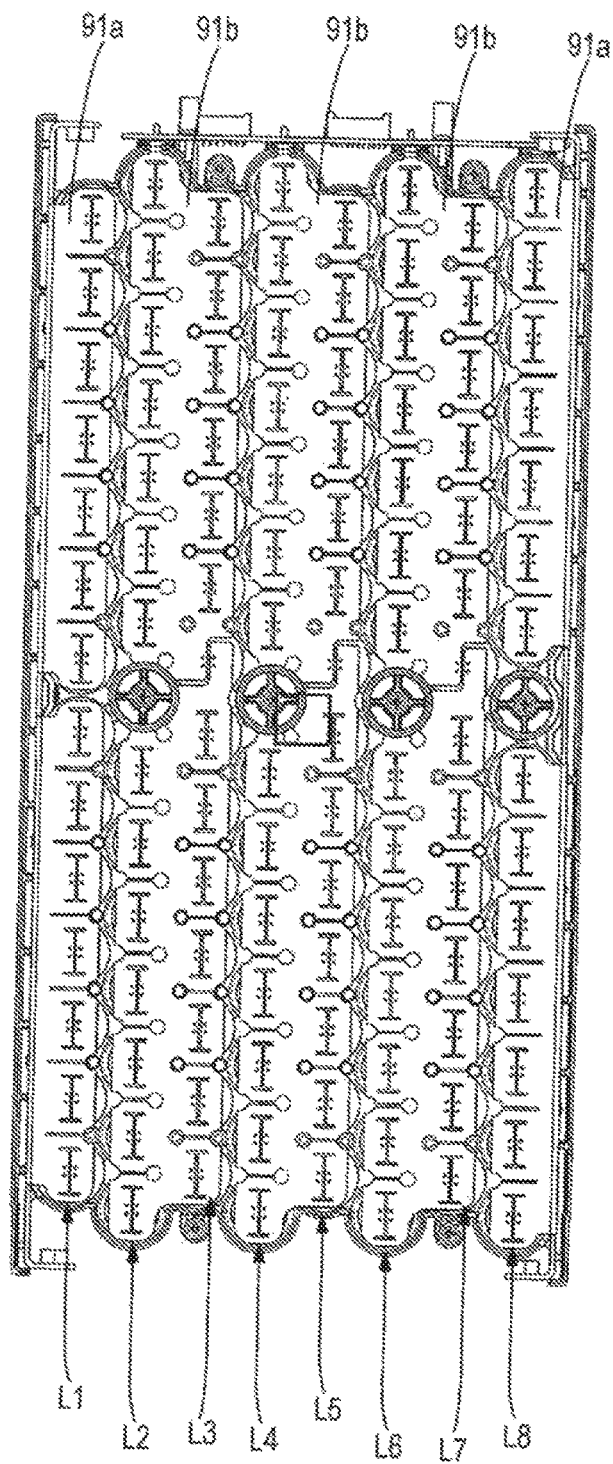
FIG. 13 is a plane view illustrating an outline of a power storage device.

The connection terminal unit 91 functioning as a jointing member which electrically connects a plurality of battery cells 10a is provided on terminal faces of a plurality of battery cells 10a. The connection terminal unit 91 is, for example, a plate-like body or the like having a plane shape such as, a rectangular shape. For example, as illustrated in FIG. 13, two connection terminal units 91a and three connection terminal units 91b are arranged in parallel in a direction substantially perpendicular to the line direction of the battery line as the connection terminal unit 91. A plurality of holes 96 is provided through the connection terminal unit 91b to make it possible to insert the projection units 93a of the partition plates 93 through.

The connection terminal unit 91a is electrically joined to terminal faces of a plurality of battery cells 10a included in one battery line. The connection terminal unit 91b is electrically joined to terminal faces of a plurality of battery cells 10a included in two adjacent battery lines.

Specifically, the connection terminal unit 91a is electrically joined to positive electrode terminals of a plurality of battery cells 10a included in the battery line L1. The connection terminal unit 91a is electrically joined to positive electrode terminals of a plurality of battery cells 10a included in the battery line L8.

The connection terminal unit 91b is electrically joined to negative electrode terminals of a plurality of battery cells 10a included in the battery line L2 and positive electrode terminals of a plurality of battery cells 10a included in the battery line L3. The connection terminal unit 91b is electrically joined to negative electrode terminals of a plurality of battery cells 10a included in the battery line L4 and positive electrode terminals of a plurality of battery cells 10a included in the battery line L5. The connection terminal unit 91b is electrically joined to negative electrode terminals of a plurality of battery cells 10a included in the battery line L6 and positive electrode terminals of a plurality of battery cells 10a included in the battery line L7.

As a method for joining, electrical resistance welding, welding using laser beam heating, and the like can be mentioned. However, the joining method is not especially limited to these methods, but a welding method well-known in the past can be used suitably.

In the present technology, at least one battery line is connected by using one connection terminal unit 91a or one connection terminal unit 91b, and consequently the resistance value can be reduced and the terminal heat generation can be reduced. Joining between connection terminal units can be performed by using simple joining. Measurement terminals of the battery cells 10a can also be made common. Since a plurality of battery cells 10a included in a battery line are joined by using one connection terminal unit, the assemble work can be simplified and in addition, the work efficiency at the time of assembling can also be improved. In addition, since the joining places can be reduced, the thermal rise of the battery cells 10a at the time of assembling and joining can be reduced. Heat generated by the battery cells 10a at the time of charging and discharging can be performed to the connection terminal unit 91a and the connection terminal unit 91b and radiated.

(Connection Terminal Unit on Bottom Case Side)

A plurality of connection terminal units 91b is arranged in parallel in a direction substantially perpendicular to the line direction of the battery line on a face of inside of the bottom face unit of the bottom case 61b as the connection terminal unit 91. One connection terminal unit 91b is electrically joined to terminals on bottom faces of battery cells 10a included in two adjacent battery lines.

Specifically, the connection terminal unit 91b is electrically joined to negative electrode terminals of a plurality of battery cells 10a included in the battery line L1 and positive electrode terminals of a plurality of battery cells 10a included in the battery line L2. The connection terminal unit 91b is electrically joined to negative electrode terminals of a plurality of battery cells 10a included in the battery line L3 and positive electrode terminals of a plurality of battery cells 10a included in the battery line L4. The connection terminal unit 91b is electrically joined to negative electrode terminals of a plurality of battery cells 10a included in the battery line L5 and positive electrode terminals of a plurality of battery cells 10a included in the battery line L6. The connection terminal unit 91b is electrically joined to negative electrode terminals of a plurality of battery cells 10a included in the battery line L7 and positive electrode terminals of a plurality of battery cells 10a included in the battery line L8.

Although the connection terminal units 91b shown in FIG. 13 are electrically joined to negative electrode terminals of a plurality of battery cells 10a that are disposed in the direction of lines L1 to L7, the connection terminal units 91b may alternatively be joined to a plurality of battery cells that are disposed in a direction diagonal to the direction of lines L1 to L7.

(Configuration Example of Connection Terminal Unit)

Figure 14:
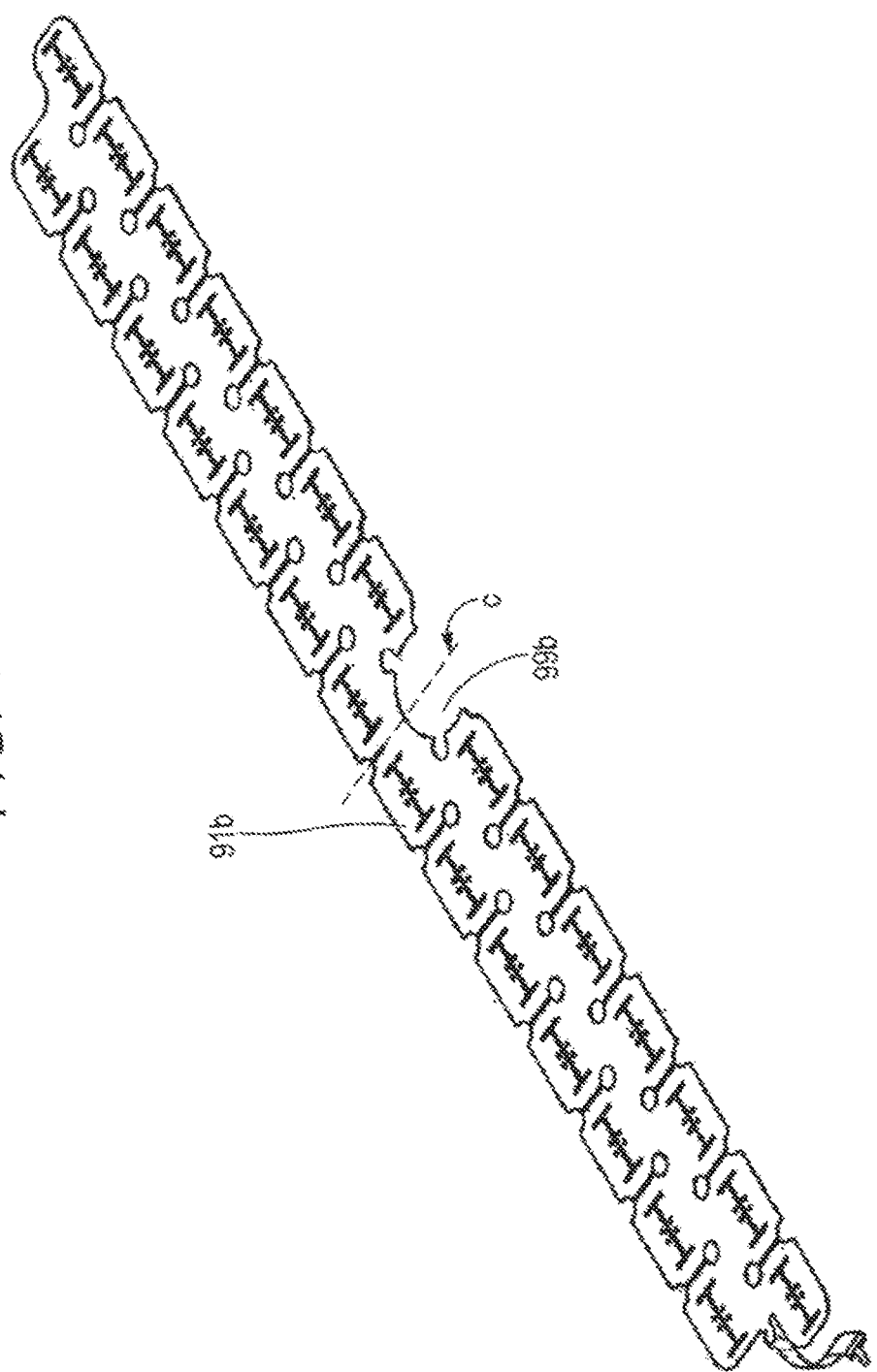
FIG. 14 is a perspective view illustrating a configuration example of a connection terminal unit.
Figure 15:
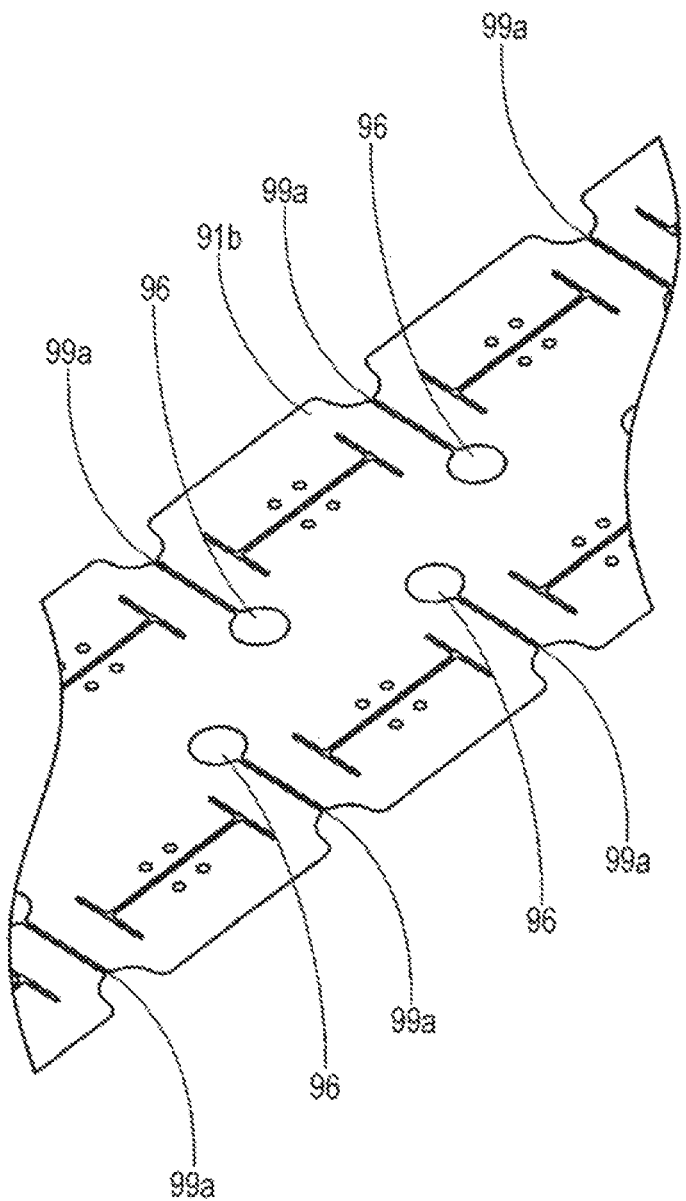
FIG. 15 is a perspective view in which a portion of a connection terminal unit is enlarged.

FIG. 14 is a perspective view illustrating a configuration example of the connection terminal unit. FIG. 15 is a perspective view in which a portion of the connection terminal unit is enlarged. A plurality of holes 96 are provided through the connection terminal unit 91b to make it possible to insert the projection units 93a of the partition plates 93 through. The connection terminal unit 91b is disposed to be parallel in longitudinal direction to the line direction of the battery line. Furthermore, one or more cut outs 99a cut from the side end of the connection terminal unit 91b are formed in a direction substantially perpendicular to the longitudinal direction of the connection terminal unit 91b. The cut outs 99a may take a shape of, for example, a rectangle, a wave or a curve. Since the cut out 99a is formed, heat propagation in the connection terminal unit 91b can be suppressed in a case where the battery cells 10a generate heat abnormally.

It is desirable to form the cut out 99a for example, in a position corresponding to a boundary between adjacent battery cells 10a connected in parallel. It is possible to efficiently suppress thermal influence from one battery cell 10a to another adjacent battery cell 10a by forming the cut out 99a in a position corresponding to a boundary between adjacent battery cells 10a. Furthermore, in a case where a battery cell 10a internally short-circuits and a current flows in from a battery cell 10a connected in parallel, the connection terminal unit 91b is blown with the cut out 99a as a start point by Joule heat generation caused by an electric resistance of the connection terminal unit 91b, and consequently a current which flows in can be intercepted. Furthermore, since the cut direction of the cut out 99a is substantially parallel to a direction in which the current flows (a direction in which battery cell blocks are connected in series), the cut out does not obstruct the current flow at the time of ordinary use. Only at the time of abnormality, the cut out can obstruct current flow in a different direction.

The connection terminal unit 91b takes substantially a line symmetrical shape about a center line c along a short direction serving as a symmetry axis. The connection terminal unit 91b has a notch 99b in a center portion in the longitudinal direction. The notch 99b takes a shape of, for example, a circular arc. For example, the notch 99b in the connection terminal unit 91b is disposed in a position that overlaps a space substantially corresponding to one battery cell in an even-numbered battery line. Heat propagation can be suppressed by providing the notch 99b. Furthermore, when a large current is generated by abnormality in the battery, the connection terminal unit 91 is blown with the notch 99b as a start point and the current can be intercepted. The connection terminal unit 91a also includes similar cut outs 99a and notch 99b, and takes a shape which is substantially line symmetrical about a center line along a short direction serving as a symmetry axis. The connection terminal unit 91a also brings about an action and effect similar to those described above.

(Positive Electrode Insulation Sheet on Top Case Side)

Referring back to FIG. 9, a positive electrode insulation sheet 92 is piled on positive electrode terminal faces of the battery cells 10a included in the battery block group 10. Specifically, the positive electrode insulation sheet 92 is piled on the positive electrode terminal faces of the battery cells 10a having positive electrode terminal faces on top faces. The positive electrode insulation sheet 92 is piled on the positive electrode terminal faces of a plurality of battery cells 10a included in each battery line.

The positive electrode insulation sheet 92 is formed of a material having an electrical insulation property such as a resin material having an electrical insulation property. A plurality of openings is provided on the positive electrode insulation sheet 92 to make it possible to insert a plurality of convex shaped positive electrode terminals therein.

Positive electrode terminals are respectively inserted into a plurality of openings of the positive electrode insulation sheet 92, and the positive electrode terminals are exposed from the openings of the positive electrode insulation sheet 92. The positive electrode terminals exposed from the openings of the positive electrode insulation sheet 92 are electrically joined to the connection terminal unit 91a or the connection terminal unit 91b. On the other hand, since faces around the positive electrode terminals are covered by the positive electrode insulation sheet 92, the faces around the positive electrode terminals are insulated from the connection terminal unit 91a or the connection terminal unit 91b.

(Positive Electrode Insulation Sheet on Bottom Case Side)

In the same way as the positive electrode insulation sheet 92 on the top case side, the positive electrode insulation sheet 92 on the bottom case 61b side is provided to prevent short-circuit between faces around convex shaped positive electrode terminals and the connection terminal unit 91b. The positive electrode insulation sheet 92 on the battery case side is piled on positive electrode terminal faces of the battery cells 10a in the battery line L2, the battery line L4, the battery line L6, and the battery line L8.

(Configuration of Partition Plate)

(Partition Plate)

Figure 16:
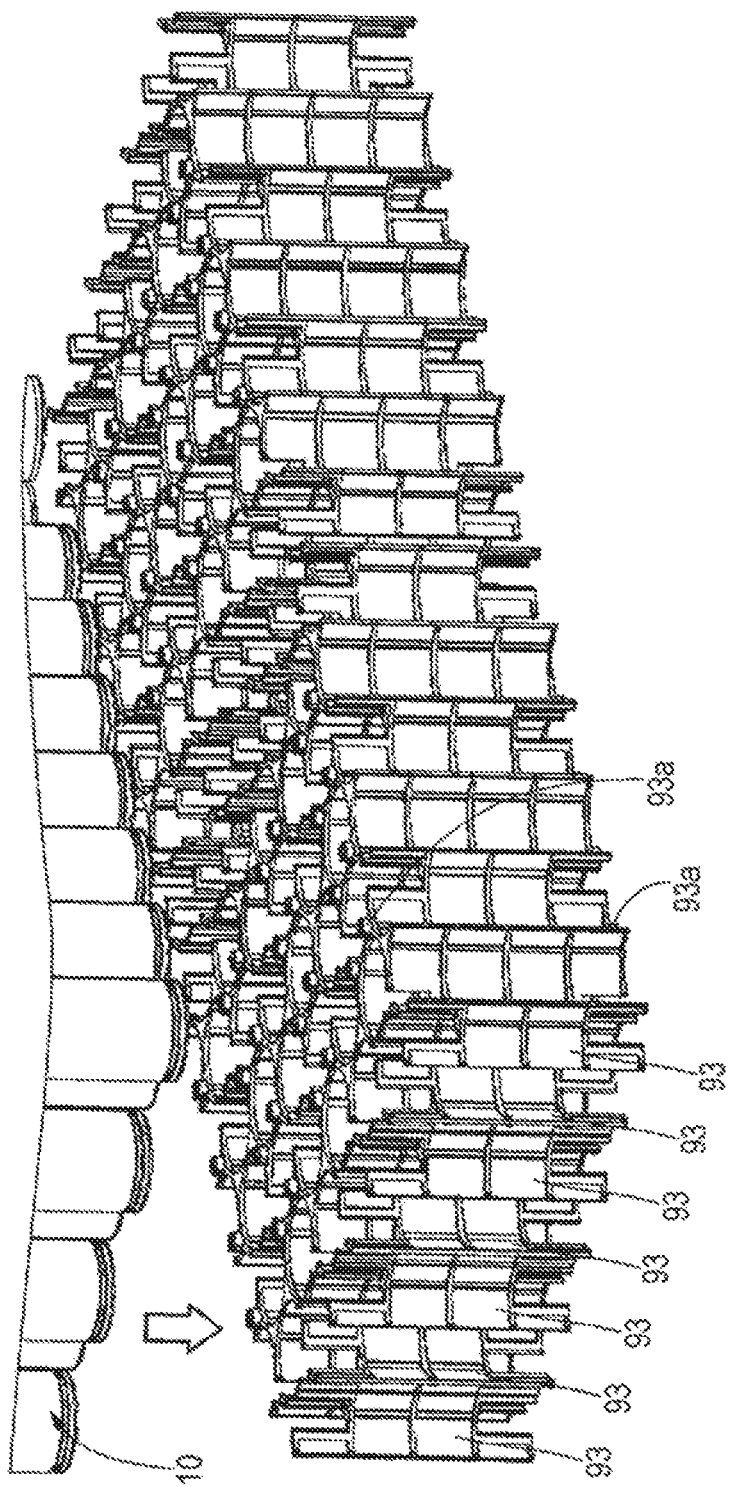
FIG. 16 is a schematic perspective view illustrating a configuration of a partition plate and a state before the partition plate is combined with a battery block group.

FIG. 16 is a schematic perspective view illustrating a configuration of the partition plate and a state before the partition plate is combined with the battery block group. As indicated by an arrow, the partition plates 93 are inserted between opposed and adjacent battery lines in the battery block group 10. The partition plates 93 are, such as, molded articles of resin including resin having an electric insulation property.

Furthermore, the partition plates 93 can be attached to and detached from the battery case 61. The partition plate 93 has a plurality of projection units 93a on its top face and its bottom face. The partition plate 93 is attached to the battery case 61 by fitting the projection units 93a into the holes 72 of the battery case 61. The partition plate 93 is detached from the battery case 61 by detaching the fitted projection units from the holes.

For example, the plurality of projection units 93a is provided in predetermined positions of the top face and the bottom face of the partition plate 93. A plurality of projection units 93a provided on the top face fits into a plurality of holes 72 for positioning of the partition plate provided in predetermined positions of the top case 61a. A plurality of projection units 93a provided on the bottom face fits into a plurality of holes 72 for positioning of the partition plate provided in predetermined positions of the bottom case 61b. As a result, the partition plates 93 are fixed between the top case 61a and the bottom case 61b.

It is possible to dispose and fix a plurality of battery cells 10a in predetermined positions by using fixed partition plates 93. As a result, it is possible to form the battery block group 10 in which the plurality of battery cells 10a is fixed in an arrangement optimum to high energy density, without using a holder case including a plurality of battery individual holders each corresponding to one battery shape as in the past. Furthermore, fixed partition plates 93 are provided between a plurality of battery lines stacked with side faces of the battery cells 10a directed in the vertical direction. As a result, the load applied from an upper battery cell 10a to a lower battery cell 10a can be mitigated. Force can be distributed throughout the battery block group 10 by dispersing the pressure and stress in this way. Accordingly, deformation or the like of battery cell 10a can be suppressed.

2. Second Embodiment

A configuration example of a power storage device according to a second embodiment of the present technology will now be described. The power storage device according to the second embodiment of the present technology is the same as the power storage device according to the first embodiment except that a configuration of a connection terminal unit differs. Therefore, although the configuration of the connection terminal unit will be described in detail, other configurations are similar to those in the first embodiment, and consequently detailed description of other configurations will be omitted.

FIG. 17A is a plane view illustrating a configuration example of the connection terminal unit. FIG. 17B and FIG. 17C are enlarged plane views obtained by enlarging a portion of the connection terminal unit illustrated in FIG. 17A. As illustrated in FIG. 17A and FIG. 17B, a plurality of holes 96 through which projection units 93a of a partition plate 93 is inserted are provided in a connection terminal unit 91b in the same way as the first embodiment. The connection terminal unit 91b is disposed to have a longitudinal direction parallel to a line direction of a battery line. Furthermore, one or more cut outs 99a cut from side ends of the connection terminal unit 91b are formed in a direction substantially perpendicular to the longitudinal direction of the connection terminal unit 91b. Propagation of heat in the connection terminal unit 91b can be suppressed by forming the cut outs 99a.

It is desirable to form the cut out 99a, for example, in a position corresponding to a boundary between adjacent battery cells 10a connected in parallel in the same way as the first embodiment. Furthermore, the connection terminal unit 91b takes substantially a line symmetrical shape about a center line c along a short direction serving as a symmetry axis in the same way as the first embodiment. The connection terminal unit 91b has a notch 99b in a center portion in the longitudinal direction. The notch 99b takes a shape of, for example, a circular arc. The connection terminal unit 91a also includes similar cut outs 99a and notch 99b, and takes a shape which is substantially line symmetrical about a center line along a short direction serving as a symmetry axis. The connection terminal unit 91a also brings about an action and effect similar to those described above.

A plurality of cut outs 99c is further formed in the connection terminal unit 91b at intervals along the longitudinal direction of the connection terminal unit 91b. The cut outs 99c are formed, for example, in a position located on the center side as compared with a joining region where terminal faces of the battery cells 10a are joined, in the short direction of the connection terminal unit 91b. In the connection terminal unit 91b, a region P between the cut outs 99c functions as a portion to be fused, for example, when the battery cell 10a generates heat abnormally. Therefore, safety can be further improved. Furthermore, propagation of heat in the connection terminal unit 91b can be further suppressed. A portion fused to intercept a current, such as a region between the cut outs 99c, is referred to as fusing unit. In the example below, a length of the cut outs 99c and a length between the cut outs 99c are referred to as length L' of the cut outs 99c and length w' between the cut outs 99c, as illustrated in FIG. 17C. A length of the fusing unit corresponds to the length L' of the cut outs 99c, and a width of the fusing unit corresponds to the length w' between the cut outs 99c.

It is desirable that the plurality of cut outs 99c is formed, for example, to cause the fusing unit, which is a region between the cut outs 99c, to become at least any of the following states. That is, for example, the fusing unit is located on a center side as compared with a joining region where terminal faces of the battery cells 10a are joined, in the short direction of the connection terminal unit 91b. For example, one fusing unit is disposed for every one joining region where a terminal face of one battery cell 10a is joined. For example, a plurality of fusing units is located on a straight line along the longitudinal direction of the connection terminal unit 91b. For example, a line including a plurality of fusing units is arranged on a straight line along the longitudinal direction of the connection terminal unit 91b, and two lines are arranged in the short direction of the connection terminal unit 91b. For example, the line of fusing units arranged in the two lines is located on the center side as compared with the joining region where terminal faces of the battery cells 10a are joined, in the short direction of the connection terminal unit 91b.

As illustrated in FIG. 17A and FIG. 17B, the cut outs 99c may be formed to be linked to the hole 96. In a case where the holes 96 are not formed, the cut outs 99c may be formed to be linked to the cut out 99a. The cut outs 99c may be linked neither to the hole 96 nor to the cut out 99a. Furthermore, the shape of the cut outs 99c may be a straight line shape, a shape including a curve, or a shape including an angle. Although not illustrated, the cut outs 99c similar to those in the connection terminal unit 91b may be connected in the connection terminal unit 91a as well.

As for the connection terminal unit 91b, it is further desirable to adjust the shape, material, and the like of the fusing unit to cause an electrical resistance Rt of the fusing unit to satisfy Expression (1) below. The reason is because it becomes possible to fuse the fusing unit more certainly in a case where heat is generated abnormally, and a current can be let flow without temperature of the connection terminal unit 91b becoming high at the time of ordinary use.

[Mathematical Formula 2]

$$\frac{T_1 - T_C}{R_\theta I_1^2 \left(1 - e^{-\frac{t_1}{CR_\theta}}\right)} \leq R_t \leq \frac{\Delta T_0}{R_\theta I_0^2} \quad (1)$$

$T_1$: Melting point [K] of the fusing unit
$T_C$: Temperature of environment (atmosphere temperature) [K] in which the power storage device is used
$I_1$: Short-circuit current (current flowing at time of short-circuit) [A]
C: Thermal capacity [J/K] of the fusing unit
$t_1$: Fusing time [sec] of the fusing unit in case where the short-circuit current has flown, $t_1=1$ [sec]
$R_\theta$: Thermal resistance [K/W] of the fusing unit found according to $R_\theta=(1/\lambda)\times(L/S)$
($\lambda$: thermal conductivity [W/m] of a heat transfer unit in the connection terminal unit, L: length [m] of the heat transfer unit in the connection terminal unit, S: cross-sectional area [m$^2$] of the heat transfer unit in the connection terminal unit (width [m] of the heat transfer unit in the connection terminal unit×thickness [m] of the heat transfer unit in the connection terminal unit)

$R_t$: Electrical resistance [Ω] of the fusing unit found according to $R_t=(1/\sigma)\times(L'/S')$ (σ: electric conductivity [1/Ω·m] of the fusing unit, L': length [m] of the fusing unit, S': cross-sectional area [m] of the fusing unit $I_0$=Maximum current at time of ordinary use [A]

$\Delta T_0$=Upper limit of temperature rise $\Delta T_0$ [K]

In expression (1), $T_C$ is a temperature of environment where the power storage device is in use (atmosphere temperature). A temperature corresponding to environment temperature at which the power storage device is in use is substituted into $T_C$. A lower limit temperature of environment temperature depending upon specifications of the power storage device may be substituted. A melting point depending upon a conductive material included in the connection terminal unit 91b is substituted into $T_1$. As a material of the connection terminal unit 91b, a conductive material such as copper is used.

Fusing time in a case where a short-circuit current has flown is set in $t_1$. For example, $t_1$=1 [sec] is set from the viewpoint of safety. From a viewpoint of further improving the safety, for example, $t_1$ may be a value smaller than 1 [sec]. For example, $t_1$ may be $t_1$=0.5 [sec]. The short-circuit current I1 is magnitude of a current (short-circuit current) that flows at the time of short-circuit. For example, three pairs of two measurement points are provided on a route through which the short-circuit current flows. A current value is obtained by measuring a resistance value between measurement points of each pair and measuring a voltage at the time of short-circuit. A value of the short-circuit current $I_1$ can be obtained by calculating an average value of three current values.

The thermal capacity C is a thermal capacity of the fusing unit, and found according to specific heat c [J/g·K] of the fusing unit×mass [g] of the fusing unit. The thermal capacity C can be calculated by substituting specific heat of the fusing unit depending upon the material of the connection terminal unit and a value depending upon the mass of the fusing unit into this expression.

A maximum current of the power storage device (a maximum current at the time of ordinary use) is substituted into I0. An upper limit value of temperature rise of the connection terminal unit (the power storage device) in a case where the maximum current flows is substituted into ΔT0. For example, values depending upon specifications of the power storage device are substituted into them.

Expression (1) has been introduced as described hereafter. A temperature change ΔT [K] for t seconds in a case where a current I [A] has flown can be specified by the following expression.

C (thermal capacity of the fusing unit) ΔT=(q (calorific value of the fusing unit)−q' (radiation amount of the fusing unit) Δt Considering with a minute amount, $C(dT/dt)=q-q'$      Expression (a)

Substituting $q=R_t I^2$ and $q'=T/R_\theta$ into Expression (a),
$C(dT/dt)=R_t I^2-T/R\theta$      Expression (b)

Solving Expression (b), $T(t)=R_\theta R_t I^2(1-e^{(t/-CR\theta)})$      Expression (c)

The electrical resistance $R_t$ of the fusing unit and the thermal resistance $R_\theta$ of the fusing unit can be specified by the following expressions.

$R_t$: Electrical resistance [Ω] of the fusing unit found according to $R_t=(1/\sigma)\times(L'/S')$ (σ: electric conductivity [1/Ω·m], L': length of the fusing unit (length of the cut outs 99c) [m], S': cross-sectional area of the fusing unit (width of the fusing unit (=length w' between the cut outs 99c) [m]×thickness of the fusing unit (=thickness d [m] of the connection terminal unit) [m²])

$R_\theta=(1/\lambda)\times(L/S)$ (λ: thermal conductivity [W/m] of the heat transfer unit in the connection terminal unit, L: length [m] of the heat transfer unit in the connection terminal unit length in a heat transfer direction from the fusing unit to an end of the connection terminal unit), S: cross-sectional area [m²] of the heat transfer unit in the connection terminal unit (width w [m] of the heat transfer unit in the connection terminal unit×thickness of the heat transfer unit in the connection terminal unit (=thickness d [m] of the connection terminal unit)).

The heat transfer unit in the connection terminal unit means a portion to which heat from the fusing unit is transferred. The thermal resistance Rθ is set to be, for example, thermal resistance at the time when heat generated in the fusing unit is transferred as far as an end of the connection terminal unit. The length from the fusing unit to the end of the connection terminal unit in the heat transfer direction is set to be the length of the heat transfer unit in the connection terminal unit.

A desirable range (Rtmin≤Rt≤Rtmax) of the electrical resistance of the fusing unit will be specified by using Expression (c).

Rtmin is an electrical resistance value that causes the fusing unit to be fused in the specified time t1 at the time of abnormality. Rtmax is an electrical resistance value that causes no problem in ordinary use (an electrical resistance value that does not fuse the fusing unit even if a current of a maximum current value is continued to be flown through the fusing unit within a range of specifications). Rtmin and Rtmax will be specified respectively by using Expression (c).

For fusing the fusing unit in the specified time t1 at the time of abnormality, it is necessary that the temperature of the fusing unit subjected to the temperature rise ΔT(t) obtained t1 seconds later after the short-circuit current I1 has flown at the time of abnormality become higher than the melting point T1 of the fusing unit (melting point of the material of the fusing unit). As a result, Expression (2) is specified.

[Mathematical Formula 3]

$$\Delta T(t) = R_\theta R_{t_{min}} I_1^2 \left(1 - e^{-\frac{t_1}{CR_\theta}}\right) \geq T_1 - T_C \quad (2)$$

Expression (2) can be rewritten as in Expression (3).

[Mathematical Formula 4]

$$R_{t_{min}} \geq \frac{T_1 - T_C}{R_\theta I_1^2 \left(1 - e^{-\frac{t_1}{CR_\theta}}\right)} \quad (3)$$

When the upper limit current in electrical specifications (the maximum current $I_0$ within the range in specifications which flows through the portion to be fused) is let flown, it is necessary that the temperature rise ΔT(t) of the fusing unit is equal to or less than the upper limit $T_0$ of the temperature rise. Therefore, the following relational expression is specified.

[Mathematical Formula 5]

$$\lim_{t \to \infty} \Delta T(t) = \lim_{t \to \infty} R_\theta R_{t_{max}} I_0^2 \left(1 - e^{-\frac{t}{CR_\theta}}\right)$$
$$= R_\theta R_{t_{max}} I_0^2 \leq \Delta T_0$$

From this relational expression, Expression (4) is introduced.

[Mathematical Formula 6]

$$R_{t_{max}} \leq \frac{\Delta T_0}{R_\theta I_0^2} \quad (4)$$

Expression (1) is introduced from Expression (c), Expression (3) and Expression (4).

[Mathematical Formula 7]

$$\frac{T_1 - T_C}{R_\theta I_1^2 \left(1 - e^{-\frac{t_1}{CR_\theta}}\right)} \leq R_t \leq \frac{\Delta T_0}{R_\theta I_0^2} \quad (1)$$

Hereafter, an example of the power storage device having the configuration illustrated in FIG. 1 as described below will be described in order to facilitate understanding of Expression (1).

Material of the connection terminal unit:
Melting point $T_1$=1353 [K]
Electric conductivity σ=23200510.41 [1/Ω·m]
Thermal conductivity λ=161 [W/m]
Specific heat c=0.385 [J/g·K]
Specific gravity ρ=890000 Shape of the connection terminal unit:
Thickness d=0.00015 [m]
Length L=0.4 [m]
Width w=0.0054 [m]
Shape of the cut outs 99c:
Length L' of the cut outs 99c=0.001 [m]
Length w' between the cut outs 99c=0.0054 [m]
Maximum current $I_0$ of the power storage device=3.571428571 [A]
Short-circuit current $I_1$=600 [A]
Environment temperature lower limit Tc=253 [K]
Temperature rise upper limit $\Delta T_0$=10 [K]
Fusing time $t_1$=1 [sec]

In the above-described example, it follows that the electrical resistance $R_t$ of the fusing unit=(1/σ)×(L'/S')=(1/σ)×(L'/w'×d)=(1/23200510.41)×(0.001/(0.0054×0.00015))= 5.321 ... ×10$^{-5}$ [Ω]≈0.0532 [mΩ].
$R_\theta$=(1/λ)×(L/S)=(1/λ)×(L/(w·d))=(1/161)×(0.4/ 0.0054·0.00015)=3067.249444 ... [K/W]
It follows that $R_{t_{max}}$ in Expression (1)=$\Delta T_0/(R_\theta \cdot I_0^2)$=10/ (3067.249444·3.571428571$^2$)=2.556 ... ×10$^{-5}$ [Ω]≈0.26 [mΩ].

Figure 18:
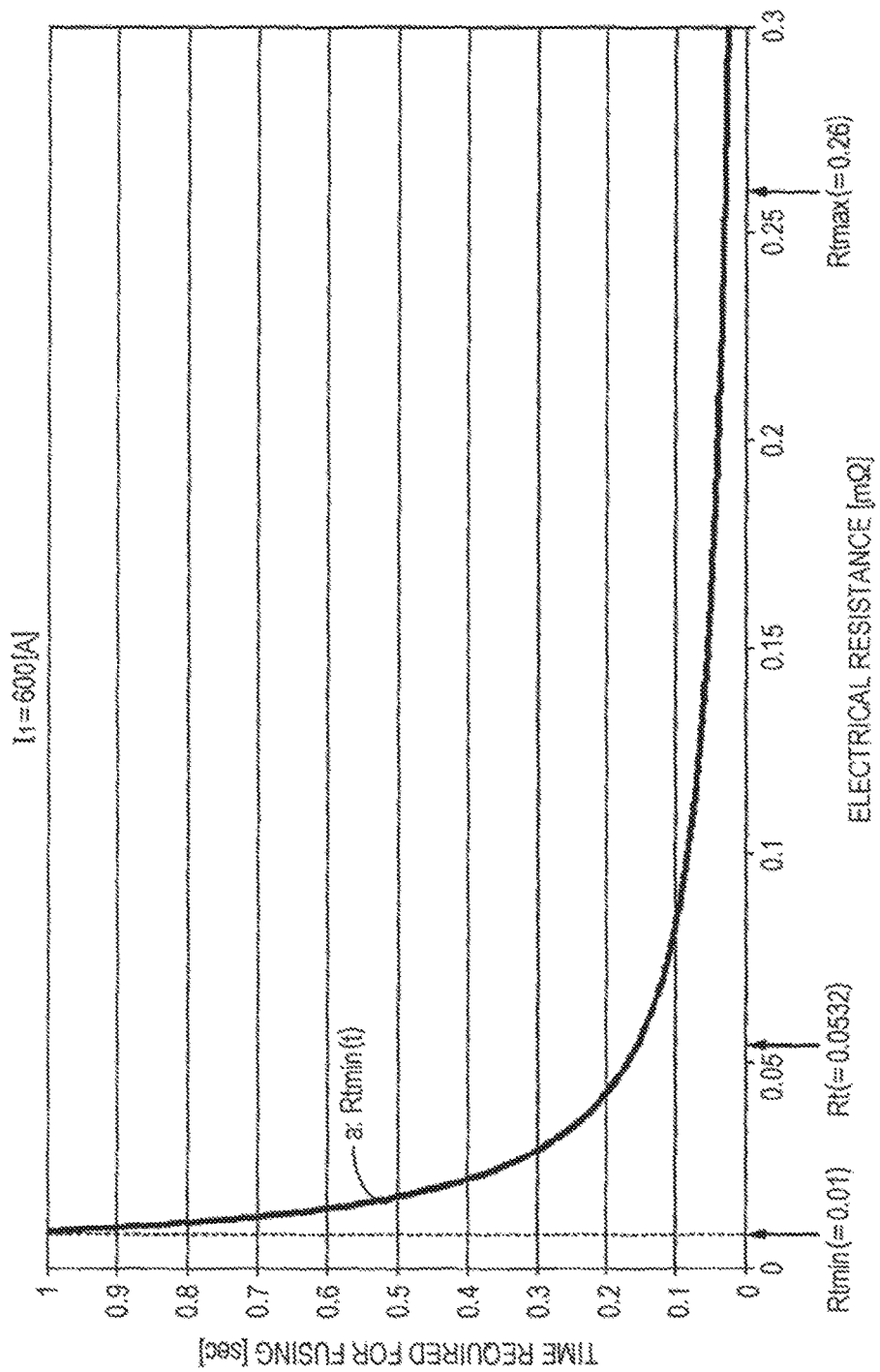
FIG. 18 is a graph obtained by plotting Rtmin(t) (line a (I1=600 A)) in coordinates of ordinate axis: time required to fuse the fusing unit (fusing time) [sec] and abscissa axis: electrical resistance [mΩ].

A graph obtained by plotting $R_{tmin}(t)$ (line a ($I_1$=600 A)) in coordinates of ordinate axis: fusing time (time required to fuse the fusing unit) [sec] and abscissa axis: electrical resistance [mΩ] is illustrated in FIG. 18. It will now be described with reference to FIG. 18 that the above-described example of the power storage device satisfies Expression (1).

As illustrated in FIG. 18, t=$t_1$=1 [sec] and $R_{tmin}(1)$=0.01 [mΩ] is the value of $R_{tmin}$. The value of $R_{tmax}$ becomes 0.26 [mΩ] as described above. The electrical resistance of the fusing unit in the connection terminal unit is $R_t$=0.0532 [mΩ], and satisfies $R_{tmin}(I_1$=600 [A], $t_1$=1 [sec])≤$R_t$ (=0.0532 [mΩ])≤0.26. In other words, it is appreciated that the electrical resistance of the fusing unit in the connection terminal unit $R_t$ (=0.0532 [mΩ]) satisfies Expression (1).

Figure 19:
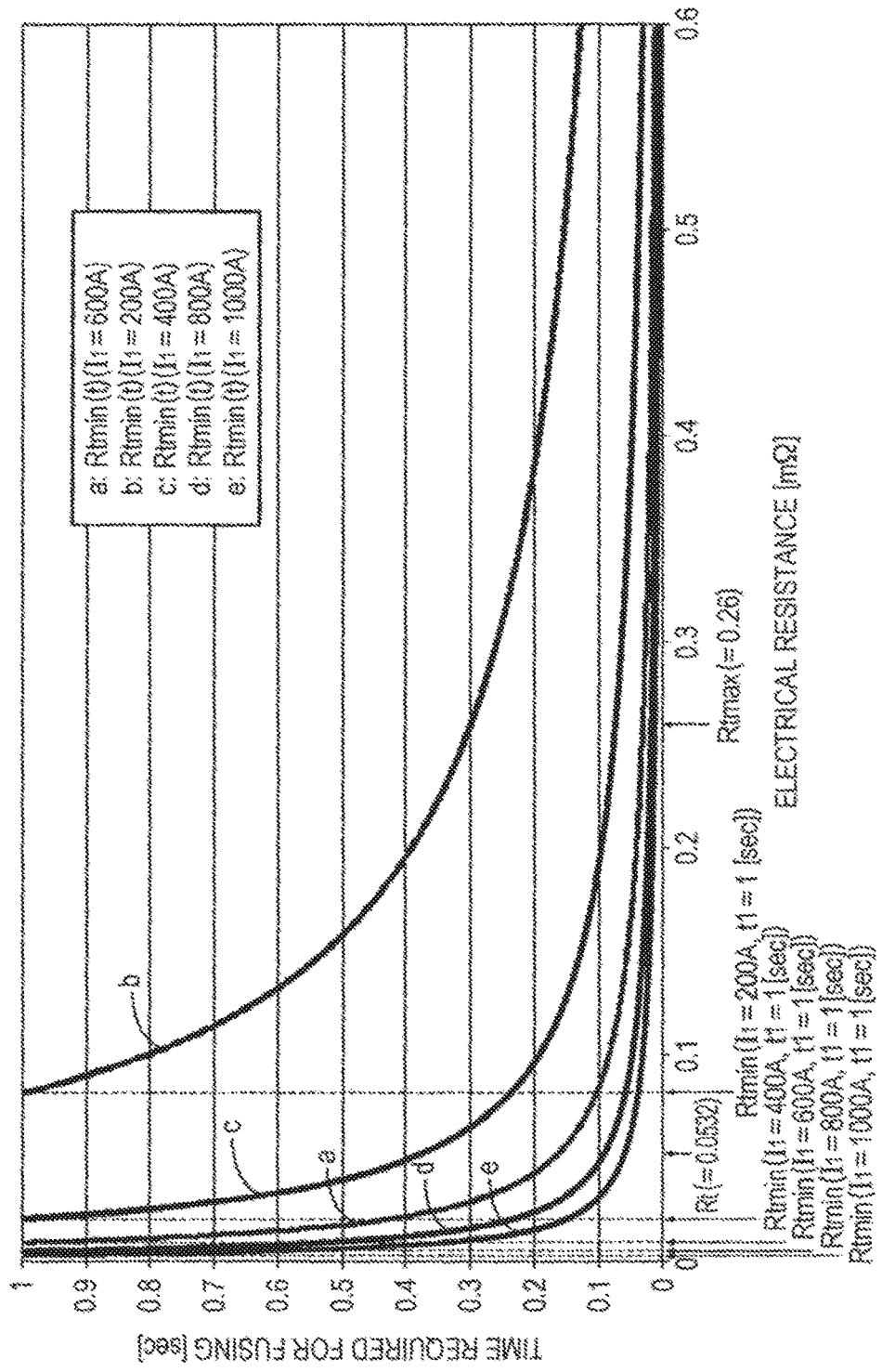
FIG. 19 is a graph obtained by plotting a line a (I1=600 A), a line b (I1=200 A), a line c (I1=400 A), a line d (I1=800 A), and a line e (I1=1000 A) indicating Rtmin(t) on coordinates of ordinate axis: fusing time [sec] and abscissa axis: electrical resistance R [mΩ].

An example of the power storage device with only the short-circuit current changed to $I_1$=200 A, 400 A, 800 A, and 1000 A in the above-described example of the power storage device will now be described with reference to FIG. 19. In FIG. 19, a line a ($I_1$=600 A), a line b ($I_1$=200 A), a line c ($I_1$=400 A), a line d ($I_1$=800 A), and a line e ($I_1$=1000 A) indicating $R_{tmin}(t)$ are plotted on coordinates of ordinate axis: fusing time [sec] and abscissa axis: electrical resistance $R_t$ [mΩ]. The line a in FIG. 19 is the same as the line a in FIG. 18.

In this case, when t=$t_1$=1 [sec], $R_{tmin}$ ($I_1$=200 A, $t_1$=1 [sec]), $R_{tmin}$ ($I_1$=400 A, $t_1$=1 [sec]), $R_{tmin}$ ($I_1$=600 A, $t_1$=1 [sec]), $R_{tmin}$ ($I_1$=800 A, $t_1$=1 [sec]), and $R_{tmin}$ ($I_1$=1000 A, $t_1$=1 [sec]) respectively become values illustrated in FIG. 19. The value of $R_{tmax}$ becomes 0.26 [mΩ] as described above.

In the case of the short-circuit current $I_1$=400 A, $I_1$=600 A, $I_1$=800 A, and $I_1$=1000 A, the relation $R_{tmin}$≤$R_t$ (=0.0532 [mΩ])≤$R_{tmax}$ holds true as illustrated in FIG. 19, and Expression (1) is satisfied. On the other hand, in the case of the short-circuit current $I_1$=200 A, it follows that $R_t$: 0.0532 [mΩ]<$R_{tmin}$ and consequently Expression (1) is not satisfied.

3. Modification Example

The present technology is not limited to the above-described embodiment of the present technology. Various modifications and applications can be made without departing from the spirit of the present technology.

For example, numerical values, structures, shapes, materials, raw materials, manufacture processes and the like described in the above-described embodiment and examples are nothing but examples. As occasion demands, numerical values, structures, shapes, materials, raw materials, manufacture processes and the like differing from them may be used. For example, a plurality of projection units and a plurality of holes may be one projection unit and one hole.

Furthermore, configurations, methods, processes, shapes, materials, numerical values and the like in the above described embodiment and examples can be combined with each other without departing from the spirit of the present technology.

In the above-described first embodiment, an example in which the number of battery units accommodated in the armoring case 20 is two has been described. However, the number of battery units accommodated in the armoring case 20 is not limited to two. For example, the number of battery units accommodated in the armoring case may be one or three or more. For example, in the power storage device, battery units may be three or more-stage stacked in the horizontal direction in a vertical mounting state with a top face unit of the top case 61a being directed in the horizontal direction, and accommodated in the armoring case 20. Furthermore, for example, in the power storage device, battery units may be three or more-stage stacked in the horizontal direction in a transversal mounting state with a top face unit of the top case 61a being directed in the vertical direction, and accommodated in the armoring case 20. Furthermore, the bottom face unit of the bottom case 61b may have a configuration similar to that of the top face unit of the top case 61a. Furthermore, two battery units 51 and 52 two or more-stage stacked in the horizontal direction with the top face unit of the top case 61a and the bottom face unit of the bottom case 61b being directed in the vertical direction may be accommodated in the armoring case 20.

The power storage device according to an embodiment of the present technology can have the following configurations.

[1] A power storage system comprising:
a plurality of battery lines, each battery line comprising a plurality of battery cells arranged in a first direction; and
a connection terminal unit electrically connected to terminal faces of each battery cell of a group of the battery cells,
wherein the group of the battery cells is disposed in a second direction, and
wherein at least one cut out is formed in the connection terminal unit.

[2] The power storage system according to [1], wherein the second direction is a same direction as the first direction.

[3] The power storage device according to [1] or [2], wherein the second direction is diagonal to the first direction.

[4] The power storage device according to any one of [1] to [3], wherein the at least one cut out is formed from an edge of the connection terminal unit in a direction substantially perpendicular to a longitudinal direction of the connection terminal unit.

[5] The power storage device according to any one of [1] to [4], wherein the cut out is formed in a position corresponding to a boundary between adjacent battery cells connected in parallel.

[6] The power storage device according to any one of [1] to [5], wherein the cut out comprises a notch in a center portion of the connection terminal unit in a longitudinal direction of the connection terminal unit.

[7] The power storage device according to any one of [1] to [6], wherein the connection terminal unit is electrically connected to terminals on bottom faces of battery cells included in two adjacent battery lines.

[8] The power storage device according to any one of [1] to [7], wherein the connection terminal unit is a plate-like body having a rectangular shape.

[9] The power storage device according to any one of [1] to [8], wherein the connection terminal unit comprises a plurality of holes.

[10] The power storage device according to any one of [1] to [9], wherein the cut out has at least one selected from the group consisting of: a rectangular shape, a curved shape, and a wavy shape.

[11] The power storage device according to any one of [1] to [10], wherein the connection terminal unit further includes additional cut outs formed at intervals along a longitudinal direction of the connection terminal unit.

[12] The power storage device according to [11], wherein an electrical resistance $R_t$ of a fusing unit which is a region between the additional cut outs satisfies Mathematical Formula 1 below:

[Mathematical Formula 1]

$$\frac{T_1 - T_C}{R_\theta I_1^2 \left(1 - e^{-\frac{t_1}{CR_\theta}}\right)} \leq R_t \leq \frac{\Delta T_0}{R_\theta I_0^2}, \quad (1)$$

wherein $T_1$ is a melting point in degrees Kelvin of the fusing unit,
wherein $T_C$ is a temperature in degrees Kelvin of an environment in which the power storage device is used,
wherein $I_1$ is a short-circuit current in Amperes flowing at a time of short-circuit,
wherein $C$ is a thermal capacity in Joules per degree Kelvin of the fusing unit,
wherein $t_1$ is a fusing time in seconds of the fusing unit in a case where the short-circuit current has flown, wherein $t_1 = 1$ second,
wherein $R_\theta$ is a thermal resistance in degrees Kelvin per Watts of the fusing unit and $R_\theta = (1/\lambda) \times (L/S)$,
wherein $\lambda$ is a thermal conductivity in Watts per meter of a heat transfer unit in the connection terminal unit,
wherein $L$ is a length in meters of the heat transfer unit,
wherein $S$ is a cross-sectional area in square meters of the heat transfer unit,
wherein $R_t$ is an electrical resistance in Ohms of the fusing unit and $R_t = (1/\sigma) \times (L'/S')$,
wherein $\sigma$ is an electric conductivity $[1/\Omega \cdot m]$ of the fusing unit,
wherein $L'$ is a length of the fusing unit in meters,
wherein $S'$ is a cross-sectional area of the fusing unit in square meters,
wherein $I_0$ is a maximum current in Amperes at a time of ordinary use, and
wherein $\Delta T_0$ is an upper limit of temperature rise in degrees Kelvin.

[13] A power storage device comprising:
a plurality of battery lines each including a plurality of battery cells arranged in a line form in a line direction,
a battery block group obtained by arranging the plurality of battery lines in parallel in a direction substantially perpendicular to the line direction of the battery lines and
a connection terminal unit joined to terminal faces of a plurality of battery cells included in at least one of the battery lines, the connection terminal unit disposed to be parallel to the line direction of the battery lines,
wherein the connection terminal unit includes a fusing unit to be fused to intercept a current, and
wherein an electrical resistance $R_t$ of the fusing unit satisfies Mathematical Formula 2:

[Mathematical Formula 2]

$$\frac{T_1 - T_C}{R_\theta I_1^2 \left(1 - e^{-\frac{t_1}{CR_\theta}}\right)} \leq R_t \leq \frac{\Delta T_0}{R_\theta I_0^2}, \quad (1)$$

wherein $T_1$ is a melting point in degrees Kelvin of the fusing unit,
wherein $T_C$ is a temperature in degrees Kelvin of an environment in which the power storage device is used,
wherein $I_1$ is a short-circuit current in Amperes flowing at a time of short-circuit,
wherein $C$ is a thermal capacity in Joules per degree Kelvin of the fusing unit, wherein $t_1$ is a fusing time in seconds of the fusing unit in case where the short-circuit current has flowed,
wherein $t_1 = 1$ second,
wherein $R_\theta$ is a thermal resistance in degrees Kelvin per Watts of the fusing unit and $R_\theta = (1/\lambda) \times (L/S)$,
wherein $\lambda$ is a thermal conductivity in Watts per meters of a heat transfer unit in the connection terminal unit,
wherein L is a length in meters of the heat transfer unit,
wherein S is a cross-sectional area in square meters of the heat transfer unit,
wherein $R_t$ is an electrical resistance in Ohms of the fusing unit and $R_t = (1/\sigma) \times (L'/S')$,
wherein $\sigma$ is an electric conductivity [1/Ω·m] of the fusing unit,
wherein L' is a length in meters of the fusing unit, wherein S' is a cross-sectional area in square meters of the fusing unit,
wherein $I_0$ is a maximum current in Amperes at a time of ordinary use, and
wherein $\Delta T_0$ is an upper limit of temperature rise in degrees Kelvin.

[14] A power storage system comprising:
a power generation device that generates power from renewable energy; and
the power storage device according to any one of [1] to [13],
wherein the power storage device is charged by the power generation device.

[15] A power storage system comprising:
the power storage device according to any one of [1] to [13]; and
at least one electronic device connected to the power storage device,
wherein the power storage device supplies power to the at least one electronic device.

[16] A power storage system for a house comprising:
a concentrated electric power system;
a power generation device;
a control device; and
the power storage device according to any one of [1] to [13],
wherein power is supplied to the power storage device from the concentrated electric power system using a power network,
wherein the power generation device supplies power to the power storage device and a power consumption device, and
wherein the control device controls the amount of power supplied to the power storage device from the concentrated electric power system and the power generation device.

[17] A power storage system for a vehicle comprising:
an engine;
an electric generator;
a power driving force conversion device;
a driving wheel; and
the power storage device according to any one of [1] to [13],
wherein the power driving force conversion device is activated by power from the power storage device,
wherein a rotating force of the power driving force conversion device is transmitted to the driving wheel, and
wherein a rotating force of the engine is transmitted to the electric generator

[18] An electronic device supplied with power from the power storage device according to any one of [1] to [13].

[19] An electric vehicle comprising:
a conversion device which is supplied with power from the power storage device according to any one of [1] to [13], and which converts the power to a driving force of the electric vehicle; and
a control device which performs information processing concerning vehicle control on the basis of information concerning the power storage device.

[20] A power storage device comprising:
an exterior battery case;
a first battery unit including a first battery block group; and
a second battery unit including a second battery block group,
wherein each of the first battery block group and the second battery block group comprises a plurality of battery lines each including a plurality of battery cells arranged in a first direction, the plurality of battery lines arranged in parallel in a second direction substantially perpendicular to the first direction,
wherein each of the first battery unit and the second battery unit comprises a fitting unit projected from a top face unit of the battery unit,
wherein the fitting unit of the first battery unit is opposed to and in contact with the fitting unit of the second battery unit, and
a gap is formed between the first battery unit and the second battery unit.

[21] A connection terminal unit for electrically connecting a plurality of battery cells, comprising at least one cut out formed in the connection terminal unit.

4. Application Example

Hereafter, application examples of the power storage device will be described. Application examples of the power storage device are not limited to application examples described hereafter.

The present technology is a power storage system in which the above-described power storage device is charged by a power generation device that generates power from renewable energy. The present technology is a power storage system that has the above-described power storage device and that supplies power to electronic devices connected to the power storage device. These electronic devices and a power system are executed as, for example, a power supply system in a house. In addition, the electronic devices and the power system are executed as, for example, a power supply system in a house. In addition, the electronic devices and the power system are executed as a system that performs efficient supply of power in cooperation with an external power supply network. In addition, the present technology is an electric vehicle including a conversion device which is supplied with power from the above-described power storage device and which converts the power to drive force of the vehicle, and a control device which performs information processing concerning vehicle control on the basis of information concerning the power storage device. The present technology is a power system including a power information transmission/reception unit which transmits/receives a signal to/from another device via a network, and exercising charging/discharging control of the above-described power storage device on the basis of information received by the transmission/reception unit. The present technology is a power system which is supplied with power from the above-described power storage device or which supplies power to the power storage device from the power generation device or the power network.

"Power Storage System in House as Application Example"

Figure 20:
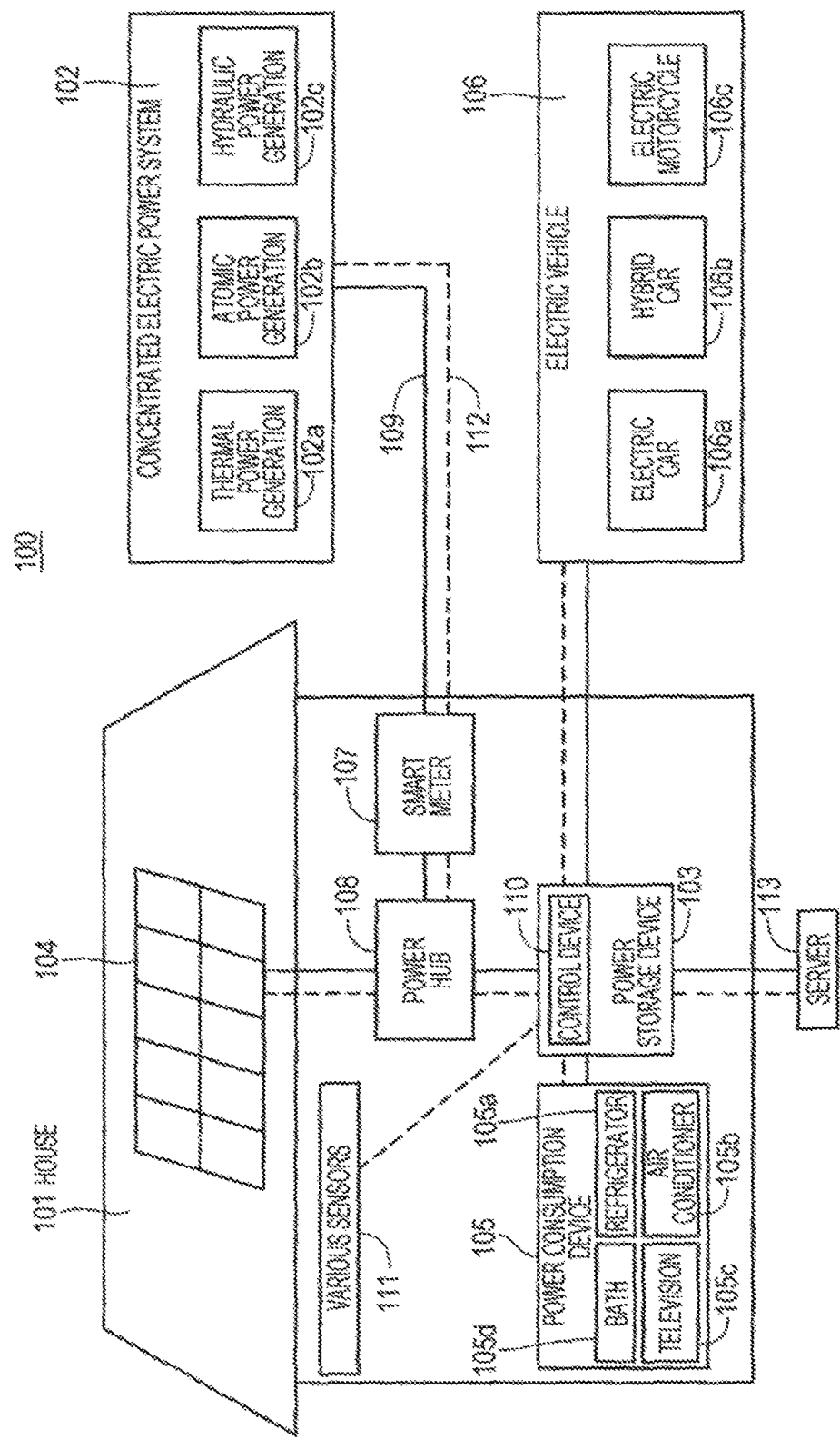
FIG. 20 is a block diagram for explaining an application example of a power storage device according to an embodiment of the present technology.

An example in which the present technology is applied to a power storage system for house will now be described with reference to FIG. 20. For example, in a power storage system 100 for a house 101, power is supplied from a concentrated electric power system 102 such as thermal power generation 102a, atomic power generation 102b, and hydraulic power generation 102c to a power storage device 103 via a power network 109, an information network 112, a smart meter 107, a power hub 108, and the like. Together therewith, power is supplied from an independent power source such as a power generation device 104 to the power storage device 103. Power supplied to the power storage device 103 is stored. Power used in the house 101 is supplied by using the power storage device 103. Not only in the house 101, but also in a building, a similar power storage system can be used.

The power generation device 104, a power consumption device 105, the power storage device 103, a control device 110 which controls respective devices, the smart meter 107, and sensors 111 which acquire various kinds of information are provided in the house 101. Respective devices are connected by the power network 109 and the information network 112. As the power generation device 104, a solar cell, a fuel cell, a windmill or the like is used, and generated power is supplied to the power consumption device 105 and/or the power storage device 103. The power consumption device 105 is a refrigerator 105a, an air conditioner 105b, a television receiver 105c, a bath 105d and the like. The electric vehicle 106 is included in the power consumption device 105. The electric vehicle 106 is an electric car 106a, a hybrid car 106b, an electric motor cycle 106c. The electric vehicle 106 may be an electrically assisted pedal cycle or the like.

The power storage device 103 includes a secondary battery or a capacitor. The power storage device includes, for example, a lithium ion secondary battery. The lithium ion secondary battery may be stationary type or may be that used in the electric vehicle 106. The above-described power storage device 1 according to an embodiment of the present technology can be applied to the power storage device 103. One or a plurality of power storage devices 1 can be applied. The smart meter 107 has a function of detecting a used quantity of commercial power and transmitting the detected used quantity to a power corporation. The power network 109 may be one of DC power supply, AC power supply, and non-contact power supply, or a combination of them.

The various sensors 111 are, for example, a person detection sensor, an illuminance sensor, a body detection sensor, a power consumption sensor, a vibration sensor, a contact sensor, a temperature sensor, an infrared ray sensor, and the like. Information acquired by the various sensors 111 is transmitted to the control device 110. Owing to the information from the sensors 111, it is possible to grasp the meteorological state, the person state and the like, automatically control the power consumption device 105, and minimize energy consumption. In addition, the control device 110 can transmit information concerning the house 101 to an external power corporation or the like via the Internet.

Processing such as power line branching and DC-AC conversion is performed by the power hub 108. As for a communication system of the information network 112 connected to the control device 110, there are a method of using a communication interface such as Universal Asynchronous Receiver Transmitter: transmission/reception circuit for asynchronous serial communication (UART), and a method of using a sensor network according to wireless communication standards such as Bluetooth, ZigBee, or Wi-Fi. The Bluetooth system is applied to multimedia communication, and communication of one-to-many connection can be performed. The ZigBee uses a physical layer in Institute of Electrical and Electronics Engineers (IEEE) 802.15.4. IEEE 802.15.4 is a name of short distance wireless network standards called PAN (Personal Area Network) or W (Wireless) PAN.

The control device 110 is connected to an external server 113. The server 113 may be managed by the house 101, the power corporation, or a service provider. Information transmitted/received by the server 113 is, for example, power consumption information, life pattern information, power rates, weather information, calamity disaster information, and information concerning power transactions. These kinds of information may be transmitted/received from the power consumption device in a home (for example, the television receiver). However, these kinds of information may be transmitted/received from a device outside the home (for example, a mobile telephone). These kinds of information may be displayed on a device having a display function such as, a television receiver, mobile telephone, or Personal Digital Assistants (PDA).

The control device 110 which controls respective units includes a Central Processing Unit (CPU), a Random Access Memory (RAM), a Read Only Memory (ROM), or the like. In this example, the control device 110 is stored in the power storage device 103. The control device 110 is connected to the power storage device 103, the power generation device 104, the power consumption device 105, the various sensors 111, and the server 113 by the information network 112. The control device 110 has a function of adjusting, for example, the usage quantity of commercial power and a power generation quantity. Besides, the control device may have, for example, a function of performing power transactions in a power market.

As described heretofore, it is possible to store power generated by not only the concentrated electric power system 102 such as the thermal power generation 102a, the atomic power generation 102b, and the hydraulic power generation 102c, but also the power generation device 104 (solar photovoltaics, wind power generation) in the power storage device 103. Even if the power generated by the power generation device 104 varies, therefore, it is possible to perform control to make a power quantity sent to the external constant or discharge power as necessary. For example, it is possible to execute a way of use such as storing power obtained by solar photovoltaics in the power storage device 103, storing midnight power in the power storage device 103 with a low rate at the night, and discharging power stored in the power storage device 103 in a time zone in a daytime when the rate is high.

In this example, an example in which the control device 110 is stored in the power storage device 103 has been described. However, the control device 110 may be stored in the smart meter 107, or the control device 110 may exist singly. In addition, the power storage system 100 may be used for a plurality of homes in community housing, or may be used for a plurality of detached houses.

"Power Storage System in Vehicle as Application Example"

Figure 21:
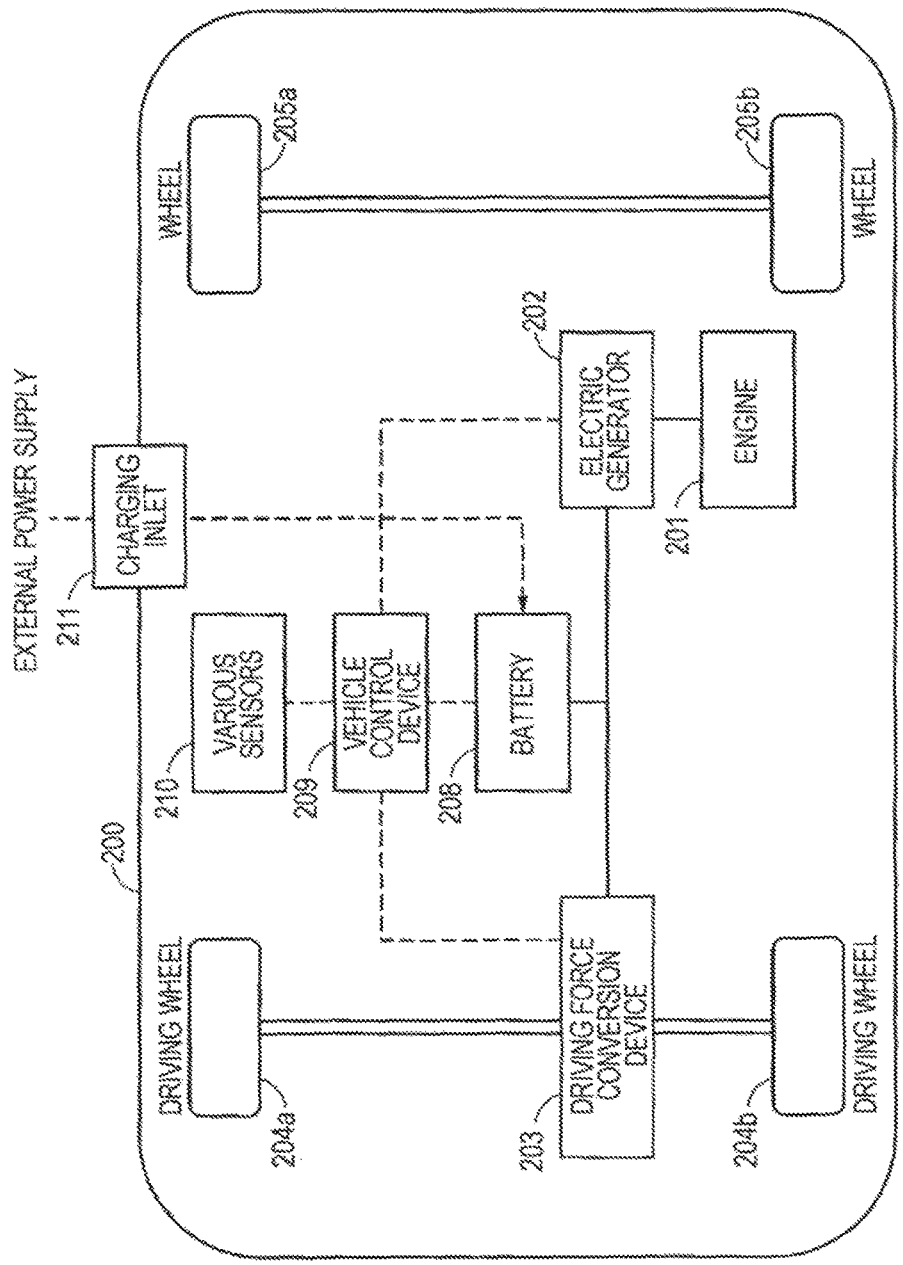
FIG. 21 is a block diagram for explaining an application example of a power storage device according to an embodiment of the present technology.

An example in which the present technology is applied to a power storage system for vehicle will be described with reference to FIG. 21. FIG. 21 schematically illustrates an example of a configuration of a hybrid vehicle that adopts a series hybrid system to which the present technology is applied. The series hybrid system is a vehicle that travels with a power driving force conversion device by using power generated by an electric generator driven by an engine or power obtained by storing the power generated by the electric generator into a battery once.

An engine 201, an electric generator 202, a power driving force conversion device 203, a driving wheel 204a, a driving wheel 204b, a wheel 205a, a wheel 205b, a battery 208, a vehicle control device 209, various sensors 210, and a charging inlet 211 are mounted on a hybrid vehicle 200. The above-described power storage device 1 according to an embodiment of the present technology is applied to the battery 208. One power storage device 1 or a plurality of power storage devices 1 is applied.

The hybrid vehicle 200 travels by using the power driving force conversion device 203 as a power source. An example of the power driving force conversion device 203 is a motor. The power driving force conversion device 203 is activated by power from the battery 208, and rotating force of the power driving force conversion device 203 is transmitted to the driving wheels 204a and 204b. No matter whether the power driving force conversion device 203 is an AC motor or a DC motor, the power driving force conversion device 203 can be applied by using direct current-alternating current (DC-AC) conversion or inverse conversion (AC-DC conversion) in a necessary position. The various sensors 210 control the number of revolutions of the engine and control opening (throttle opening) of a throttle valve which is not illustrated, via the vehicle control device 209. The various sensors 210 include a speed sensor, an acceleration sensor, an engine revolution number sensor, and the like.

The rotating force of the engine 201 is transmitted to the electric generator 202. It is possible to store power generated by the electric generator 202 owing to the rotating force into the battery 208.

When the hybrid vehicle is decelerated by a brake mechanism which is not illustrated, resisting force at the time of deceleration is applied to the power driving force conversion device 203 as rotating force. Regenerative power generated by the power driving force conversion device 203 owing to the rotating force is stored in the battery 208.

It is also possible for the battery 208 to receive supply of power from a power supply external to the hybrid vehicle via the charging inlet 211 functioning as an input inlet by connecting the battery 208 to the external power supply and store the received power.

Although not illustrated, the hybrid vehicle 200 may include an information processing device which performs information processing concerning vehicle control on the basis of information concerning a secondary battery. As such an information processing device, there is, such as, an information processing device that performs battery residual quantity display on the basis of information concerning the residual quantity of the battery.

Heretofore, a series hybrid car which travels with a motor by using power generated by an electric generator driven by an engine or power obtained by storing the power generated by the electric generator into the battery once has been described as an example. However, the present technology can also be effectively applied to a parallel hybrid car which uses outputs of both the engine and motor as drive source and suitably switches and use three systems, i.e., travel using only the engine, travel using only the motor, and travel using the engine and motor. In addition, the present technology can also be applied effectively to the so-called electric vehicle which travels with driving using only a drive motor without using an engine.

REFERENCE SIGNS LIST

1 Power storage device
2 Fuse
3a Connector
3b Connector
4 External positive electrode terminal
5 External negative electrode terminal
7 Control unit
8 MUX
9 Current detection unit
9a Current detection resistor
9b Current detection amplifier
10 Battery block group
10a Battery cell
11 Short bar
12a Plate-like projection
12b Plate-like projection
13 Support plate
14 Cover
15 Temperature detection unit
16 MUX
17 Pulse generator
20 Armoring case
20a Front face unit
20b Rear face unit
20c Top face unit
20d Bottom face unit
20e Side face unit
20f Side face unit
21 Protection cover
25a to b Window
26a to b Window
27 Connector
28 Electronic components
42 Sub board
44 Output terminal board
45 External communication board
46 Main board
47a1 Bus bar
47a2 Bus bar
47a3 Bus bar
49 Board holding member
51 Battery unit
52 Battery unit
61 Battery case
61a Top case
61b Bottom case
62 Fitting unit
62a Fitting unit
62b Fitting unit
70 Hollow structure
71 Opening
72 Hole
80 Hollow structure
91, 91a to 91b Connection terminal unit
92 Positive electrode insulation sheet
93 Partition plate
93a Projection unit
96 Hole
99a Cut out
99b Notch
99c Cut outs
100 Power storage system
101 House
102 Concentrated electric power system
102a Thermal power generation
102b Atomic power generation
102c Hydraulic power generation
103 Power storage device
104 Power generation device
105 Power consumption device
105a Refrigerator
105b Air conditioner
105c Television receiver
105d Bath 106 Electric vehicle
106a Electric car
106b Hybrid car
106c Electric motorcycle
107 Smart meter
108 Power hub
109 Power network
110 Control device
111 Sensor
112 Information network
113 Server
200 Hybrid vehicle
201 Engine
202 Electric generator
203 Power driving force conversion device
204a, 204b Driving wheel
205a, 205b Wheel
208 Battery
209 Vehicle control device
210 Sensor
211 Charging inlet
B1 to B16 Battery block
COM1 Communication unit
CTN1 Module controller
ICNT Control box
ISC1 Insulation unit
L1 to L8 Battery line
MO Power storage device

The invention claimed is:

1. A power storage device, comprising:
    a plurality of battery block groups, wherein each of the plurality of battery block groups comprising a plurality of battery blocks, wherein each of the plurality of battery blocks comprising a plurality of battery cells, wherein the plurality of battery cells in each of the plurality of battery blocks are arranged in a first direction, wherein the plurality of battery blocks in each of the plurality of battery block groups are arranged in a second direction orthogonal to the first direction,
        wherein the plurality of battery cells in each of the plurality of battery blocks is in a corresponding straight line, and
        wherein the plurality of battery cells in each of the plurality of battery blocks are interconnected in parallel; and
    a connection terminal electrically connected to terminal faces of the plurality of battery cells of a first battery block of the plurality of battery blocks,
        wherein adjacent battery blocks of the plurality of battery blocks are in a straw bag arrangement,
        wherein a first cut out is formed from an edge of the connection terminal in a third direction perpendicular to a longitudinal direction of the connection terminal,
        wherein at least one second cut out is connected to the first cut out and is extended along the longitudinal direction of the connection terminal,
        wherein the longitudinal direction of the connection terminal is substantially same as the first direction, and
        wherein a position of the first cut out corresponds to a boundary between adjacent battery cells of the plurality of battery cells connected in parallel.

2. The power storage device according to claim 1, wherein the connection terminal comprises a notch in a position that overlaps a space corresponding to at least one battery cell of the plurality of battery cells.

3. The power storage device according to claim 1, wherein the connection terminal is electrically connected to the terminal faces of battery cells included in two adjacent battery blocks of the plurality of battery blocks.

4. The power storage device according to claim 1, wherein the connection terminal is a plate-like body.

5. The power storage device according to claim 1, wherein the connection terminal comprises a plurality of holes.

6. The power storage device according to claim 1, wherein a shape of the first cut out is at least one selected from the group consisting of a rectangular shape, a curved shape, and a wavy shape.

7. The power storage device according to claim 1, wherein the connection terminal further includes a plurality of the second cut outs formed at intervals along the longitudinal direction of the connection terminal.

8. The power storage device according to claim 7, wherein an electrical resistance $R_t$ of a fusing unit which is a region between the plurality of second cut outs satisfies Mathematical Formula 1 below:

[Mathematical Formula 1]

$$\frac{T_1 - T_C}{R_\theta I_1^2 \left(1 - e^{-\frac{t_1}{CR_\theta}}\right)} \leq R_t \leq \frac{\Delta T_0}{R_\theta I_0^2}, \tag{1}$$

wherein $T_1$ is a melting point in degrees Kelvin of the fusing unit,
wherein $T_C$ is a temperature in degrees Kelvin of an environment in which the power storage device is used,
wherein $I_1$ is a short-circuit current in Amperes flowing at a time of short-circuit of battery cells of at least one battery block of the plurality of battery blocks,
wherein C is a thermal capacity in Joules per degree Kelvin of the fusing unit,
wherein $t_1$ is a fusing time in seconds of the fusing unit in a case where the short-circuit current has flown, wherein $t_1=1$ second,
wherein $R_\theta$ is a thermal resistance in degrees Kelvin per Watts of the fusing unit and $R_\theta=(1/\lambda)\times(L/S)$,
wherein $\lambda$ is a thermal conductivity in Watts per meter of a heat transfer unit in the connection terminal,
wherein L is a length in meters of the heat transfer unit,
wherein S is a cross-sectional area in square meters of the heat transfer unit,
wherein the electrical resistance $R_t$ of the fusing unit is in ohms and the electrical resistance $R_t=(1/\sigma)\times(L'/S')$,
wherein $\sigma$ is an electric conductivity [1/$\Omega\cdot$m] of the fusing unit,
wherein L' is a length of the fusing unit in meters,
wherein S' is a cross-sectional area of the fusing unit in square meters,
wherein $I_0$ is a maximum current, in Amperes, of the power storage device, and
wherein $\Delta_{T0}$ is an upper limit of temperature rise of the connection terminal in degrees Kelvin.

9. A power storage device, comprising:
    a plurality of battery blocks each including a plurality of battery cells arranged in a first direction, wherein the first direction is a longitudinal direction of the plurality of battery blocks;
    a battery block group obtained by arranging the plurality of battery blocks in parallel in a second direction substantially perpendicular to the first direction, wherein the plurality of battery cells in each of the plurality of battery blocks is in a corresponding straight line, and wherein the plurality of battery cells in each of the plurality of battery blocks are interconnected in parallel; and a connection terminal joined to terminal faces of the plurality of battery cells included in at least one of the plurality of battery blocks, the connection terminal disposed to be parallel to the first direction of the plurality of battery blocks, wherein the connection terminal includes a fusing unit to be fused in a fusing time $t_1$ to intercept a maximum current $I_0$, and wherein an electrical resistance $R_t$ of the fusing unit satisfies Mathematical Formula 1:

[mathematical formula 1]

$$\frac{T_1 - T_C}{R_\theta I_1^2 \left(1 - e^{-\frac{t_1}{CR_\theta}}\right)} \leq R_t \leq \frac{\Delta T_0}{R_\theta I_0^2}, \quad (1)$$

wherein $T_1$ is a melting point in degrees Kelvin of the fusing unit, wherein $T_C$ is a temperature in degrees Kelvin of an environment in which the power storage device is used, wherein $I_1$ is a short-circuit current in Amperes flowing at a time of short-circuit of at least one battery block of the plurality of battery blocks, wherein C is a thermal capacity in Joules per degree Kelvin of the fusing unit, wherein $t_1$ is the fusing time in seconds of the fusing unit in case where the short-circuit current has flown, wherein $t_1$=1 second, wherein $R_\theta$ is a thermal resistance in degrees Kelvin per Watts of the fusing unit and $R_\theta = (1/\lambda) \times (L/S)$, wherein $\lambda$ is a thermal conductivity in Watts per meters of a heat transfer unit in the connection terminal, wherein L is a length in meters of the heat transfer unit, wherein S is a cross-sectional area in square meters of the heat transfer unit, wherein the electrical resistance $R_t$ of the fusing unit is in ohms and the electrical resistance $R_t=(1/\sigma) \times (L'/S')$, wherein $\sigma$ is an electric conductivity [$1/\Omega \cdot m$] of the fusing unit, wherein L' is a length in meters of the fusing unit, wherein S' is a cross-sectional area in square meters of the fusing unit, wherein $I_0$ is the maximum current, in Amperes, of the power storage device, and wherein $\Delta_{T0}$ is an upper limit of temperature rise of the connection terminal in degrees Kelvin.

10. A power storage system, comprising:

a power generation device configured to generate power from renewable energy; and a power storage device, comprising:

a plurality of battery block groups, wherein each of the plurality of battery block groups comprising a plurality of battery blocks, wherein each of the plurality of battery blocks comprising a plurality of battery cells, wherein the plurality of battery cells in each of the plurality of battery blocks are arranged in a first direction, wherein the plurality of battery blocks in each of the plurality of battery block groups are arranged in a second direction orthogonal to the first direction, wherein the plurality of battery cells in each of the plurality of battery blocks is in a corresponding straight line, and wherein the plurality of battery cells in each of the plurality of battery blocks are interconnected in parallel; and a connection terminal electrically connected to terminal faces of the plurality of battery cells of a first battery block of the plurality of battery blocks, wherein adjacent battery blocks of the plurality of battery blocks are in a straw bag arrangement, wherein a first cut out is formed from an edge of the connection terminal in a third direction perpendicular to a longitudinal direction of the connection terminal, wherein at least one second cut out is connected to the first cut out and is extended along the longitudinal direction of the connection terminal, wherein the longitudinal direction of the connection terminal is substantially same as the first direction, wherein a position of the first cut out corresponds to a boundary between adjacent battery cells of the plurality of battery cells connected in parallel, and wherein the power storage device is charged by the power generation device.

11. A power storage system, comprising:

a power storage device, comprising:

a plurality of battery block groups, wherein each of the plurality of battery block groups comprising a plurality of battery blocks, wherein each of the plurality of battery blocks comprising a plurality of battery cells, wherein the plurality of battery cells in each of the plurality of battery blocks are arranged in a first direction, wherein the plurality of battery blocks in each of the plurality of battery block groups are arranged in a second direction orthogonal to the first direction, wherein the plurality of battery cells in each of the plurality of battery blocks is in a corresponding straight line, and wherein the plurality of battery cells in each of the plurality of battery blocks are interconnected in parallel; and a connection terminal electrically connected to terminal faces of the plurality of battery cells of a first battery block of the plurality of battery blocks, wherein adjacent battery blocks of the plurality of battery blocks are in a straw bag arrangement, wherein a first cut out is formed from an edge of the connection terminal in a third direction perpendicular to a longitudinal direction of the connection terminal, wherein at least one second cut out is connected to the first cut out and is extended along the longitudinal direction of the connection terminal, wherein the longitudinal direction of the connection terminal is substantially same as the first direction, and wherein a position of the first cut out corresponds to a boundary between adjacent battery cells of the plurality of battery cells connected in parallel; and at least one electronic device connected to the power storage device, wherein the power storage device is configured to supply power to the at least one electronic device.

12. A power storage system, comprising:
an electric power system;
a power generation device;
a control device; and
a power storage device, comprising:
- a plurality of battery block groups, wherein each of the plurality of battery block groups comprising a plurality of battery blocks, wherein each of the plurality of battery blocks comprising a plurality of battery cells, wherein the plurality of battery cells in each of the plurality of battery blocks are arranged in a first direction, wherein the plurality of battery blocks in each of the plurality of battery block groups are arranged in a second direction orthogonal to the first direction,
  - wherein the plurality of battery cells in each of the plurality of battery blocks is in a corresponding straight line, and
  - wherein the plurality of battery cells in each of the plurality of battery blocks are interconnected in parallel; and
- a connection terminal electrically connected to terminal faces of the plurality of battery cells of a first battery block of the plurality of battery blocks,
  - wherein adjacent battery blocks of the plurality of battery blocks are in a straw bag arrangement,
  - wherein a first cut out is formed from an edge of the connection terminal in a third direction perpendicular to a longitudinal direction of the connection terminal,
  - wherein at least one second cut out is connected to the first cut out and is extended along the longitudinal direction of the connection terminal,
  - wherein the longitudinal direction of the connection terminal is substantially same as the first direction, and
  - wherein a position of the first cut out corresponds to a boundary between adjacent battery cells of the plurality of battery cells connected in parallel,
  - wherein a power network system is configured to supply power to the power storage device from the electric power system,
  - wherein the power generation device is configured to supply power to the power storage device and a power consumption device, and
  - wherein the control device is configured to control an amount of power supplied to the power storage device from the electric power system and the power generation device.

13. A power storage system, comprising:
an engine;
an electric generator;
a power driving force conversion device;
a driving wheel; and
a power storage device, comprising:
- a plurality of battery block groups, wherein each of the plurality of battery block groups comprising a plurality of battery blocks, wherein each of the plurality of battery blocks comprising a plurality of battery cells, wherein the plurality of battery cells in each of the plurality of battery blocks are arranged in a first direction, wherein the plurality of battery blocks in each of the plurality of battery block groups are arranged in a second direction orthogonal to the first direction,
  - wherein the plurality of battery cells in each of the plurality of battery blocks is in a corresponding straight line, and
  - wherein the plurality of battery cells in each of the plurality of battery blocks are interconnected in parallel; and
- a connection terminal electrically connected to terminal faces of the plurality of battery cells of a first battery block of the plurality of battery blocks,
  - wherein adjacent battery blocks of the plurality of battery blocks are in a straw bag arrangement,
  - wherein a first cut out is formed from an edge of the connection terminal in a third direction perpendicular to a longitudinal direction of the connection terminal,
  - wherein at least one second cut out is connected to the first cut out and is extended along the longitudinal direction of the connection terminal,
  - wherein the longitudinal direction of the connection terminal is substantially same as the first direction, and
  - wherein a position of the first cut out corresponds to a boundary between adjacent battery cells of the plurality of battery cells connected in parallel,
  - wherein the power driving force conversion device is activated by power from the power storage device,
  - wherein a rotating force of the power driving force conversion device is transmitted to the driving wheel, and
  - wherein a rotating force of the engine is transmitted to the electric generator.

14. An electronic device supplied with power from a power storage device, the power storage device comprising:
- a plurality of battery block groups, wherein each of the plurality of battery block groups comprising a plurality of battery blocks, wherein each of the plurality of battery blocks comprising a plurality of battery cells, wherein the plurality of battery cells in each of the plurality of battery blocks are arranged in a first direction, wherein the plurality of battery blocks in each of the plurality of battery block groups are arranged in a second direction orthogonal to the first direction,
  - wherein the plurality of battery cells in each of the plurality of battery blocks is in a corresponding straight line, and
  - wherein the plurality of battery cells in each of the plurality of battery blocks are interconnected in parallel; and
- a connection terminal electrically connected to terminal faces of the plurality of battery cells of a first battery block of the plurality of battery blocks,
  - wherein adjacent battery blocks of the plurality of battery blocks are in a straw bag arrangement,
  - wherein a first cut out is formed from an edge of the connection terminal in a third direction perpendicular to a longitudinal direction of the connection terminal;
  - wherein at least one second cut out is connected to the first cut out and is extended along the longitudinal direction of the connection terminal,
  - wherein the longitudinal direction of the connection terminal is substantially same as the first direction, and
  - wherein a position of the first cut out corresponds to a boundary between adjacent battery cells of the plurality of battery cells connected in parallel.

15. An electric vehicle, comprising:
a conversion device which is supplied with power from a power storage device, wherein the power storage device comprising:
a plurality of battery block groups, wherein each of the plurality of battery block groups comprising a plurality of battery blocks, wherein each of the plurality of battery blocks comprising a plurality of battery cells, wherein the plurality of battery cells in each of the plurality of battery blocks are arranged in a first direction, wherein the plurality of battery blocks in each of the plurality of battery block groups are arranged in a second direction orthogonal to the first direction,
wherein the plurality of battery cells in each of the plurality of battery blocks is in a corresponding straight line, and
wherein the plurality of battery cells in each of the plurality of battery blocks are interconnected in parallel; and
a connection terminal electrically connected to terminal faces of the plurality of battery cells of a first battery block of the plurality of battery blocks,
wherein adjacent battery blocks of the plurality of battery blocks are in a straw bag arrangement,
wherein a first cut out is formed from an edge of the connection terminal in a third direction perpendicular to a longitudinal direction of the connection terminal;
wherein at least one second cut out is connected to the first cut out and is extended along the longitudinal direction of the connection terminal,
wherein the longitudinal direction of the connection terminal is substantially same as the first direction,
wherein a position of the first cut out corresponds to a boundary between adjacent battery cells of the plurality of battery cells connected in parallel, and
wherein the conversion device is configured to convert the power to a driving force of the electric vehicle; and
a control device configured to process information associated with vehicle control on a basis of information associated with the power storage device.

16. An apparatus, comprising:
a connection terminal configured to:
electrically connect a plurality of battery cells of a first battery block of a plurality of battery blocks,
wherein each battery block of the plurality of battery blocks includes the corresponding plurality of battery cells connected in parallel,
wherein adjacent battery blocks of the plurality of battery blocks are in a straw bag arrangement,
wherein the connection terminal comprises a first cut out and at least one second cut out,
wherein the first cut out is formed from an edge of the connection terminal,
wherein the first cut out is in a direction perpendicular to a longitudinal direction of the connection terminal,
wherein the at least one second cut out is connected to the first cut out and is extended along the longitudinal direction of the connection terminal, and
wherein a position of the first cut out corresponds to a boundary between adjacent battery cells of the plurality of battery cells connected in parallel.

* * * * *